United States Patent
Ishiyama

(10) Patent No.: US 8,248,403 B2
(45) Date of Patent: Aug. 21, 2012

(54) DATA COMPRESSION METHOD AND APPARATUS, DATA RESTORATION METHOD AND APPARATUS, AND PROGRAM THEREFOR

(75) Inventor: Rui Ishiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 1048 days.

(21) Appl. No.: 12/087,102

(22) PCT Filed: Dec. 22, 2006

(86) PCT No.: PCT/JP2006/326303
§ 371 (c)(1),
(2), (4) Date: Jun. 26, 2008

(87) PCT Pub. No.: WO2007/074912
PCT Pub. Date: Jul. 5, 2007

(65) Prior Publication Data
US 2009/0040216 A1 Feb. 12, 2009

(30) Foreign Application Priority Data
Dec. 27, 2005 (JP) .................................. 2005-375138

(51) Int. Cl.
*G06T 15/00* (2006.01)

(52) U.S. Cl. ........ 345/419; 345/427; 345/555; 382/232; 382/254; 382/276

(58) Field of Classification Search .................. 345/419, 345/427, 555; 382/232, 254, 276
See application file for complete search history.

(56) References Cited

U.S. PATENT DOCUMENTS
6,346,949 B1 2/2002 Fujiwara et al.
2007/0005795 A1 1/2007 Gonzalez FOREIGN PATENT DOCUMENTS
CN 1402852 A 3/2003
JP 10-124680 5/1998
JP 3341549 8/2002

OTHER PUBLICATIONS

Yano et al, Building a Morphable 3D Face Model that Relates Impressions of the Face to Physical Features, SICE Annual Conference in Sapporo, Aug. 4-6, 2004.*

(Continued)

*Primary Examiner* — Phu K Nguyen
(74) *Attorney, Agent, or Firm* — Foley & Lardner LLP

(57) ABSTRACT

Three-dimensional data (120) is compressed at a high compression ratio without deteriorating resolution and accuracy, by computing a coupling coefficient from input three-dimensional data and a three-dimensional base data group obtained from a plurality of objects and outputting the coupling coefficient as compressed data (130). Specifically, the three-dimensional data (120) is input to corresponding point determination means (101). The corresponding point determination means (101) generates three-dimensional data to be synthesized (103) in which vertexes of the three-dimensional data (120) are made to correspond to vertexes of three-dimensional reference data (111) serving as a reference to determine association relationship between vertexes. Coefficient computation means (102) computes a coupling coefficient for coupling a three-dimensional base data group (112) used for synthesis of three-dimensional data to synthesize three-dimensional data to be synthesized (103), and outputs the computed coupling coefficient as the compressed data (130) of the three-dimensional data (120).

33 Claims, 16 Drawing Sheets

OTHER PUBLICATIONS

V. Blanz et al., "A Morphable Model for the Synthesis of 3D Faces," SIGGRAPH 99 Conference Proceedings, pp. 187-193.

G. Hanaoka et al., "Facial Caricature by Computer Based on the Style of Individual Human Caricaturist," The Transactions of the Inst. Of Elec. Info and Comm. Engineers Joho System II-Joho Shori vol. J80-D-11:8, 1997, pp. 2110-2118.

R. Ishiyama et al., "A Range Finder for Human Face Measurement," IEICE Technical Report. vol. 99:118, PRMU 99-223, 1999, pp. 35-42.

H. Kamenari et al., "Human Model Adaptation to Human Body Measurement Data," Journal of the Institute of Electronics, Information and Communication Engineers, 2005, p. 259.

T. Okazaki et al., "Facial Image Coding Using Orthogonal Facial Bases," IEICE Technical Report, HC91-54-60, Human Communication, vol. 91:508, The Institute of Electronics, Information and Communication Engineers, 1992, pp. 47-54.

T. Okazaki et al., "Parameter Coding of Facial Images Using Orthogonal Facial Bases," The Institute of Electronics, Information and Communication Engineers, 1991, pp. 231-234.

W. J. Schroeder et al., Decimation of Triangle Meshes, Computer Graphics, 1992, pp. 65-70.

Aizawa et al., Model-Based Image Coding: Advanced Video Coding Techniques for Very Low Bit-Rate Applications, Proceedings of the IEEE, Feb. 1995, pp. 259-271, vol. 83, No. 2.

Bryt et al., Improving the K-SVD Image Compression Using a Linear Deblocking Method, 2008, 5 pages.

Daniel C. Heinz et al., Fully Constrained Least Squared Linear Spectral Mixture Analysis Method for Material Quantification in Hyperspectral Imagery, IEEE Transactions on Geoscience and Remote Sensing, vol. 39, No. 3, Mar. 2001, pp. 529, 545.

* cited by examiner

DATA COMPRESSION METHOD AND APPARATUS, DATA RESTORATION METHOD AND APPARATUS, AND PROGRAM THEREFOR

This application is the National Phase of PCT/JP2006/326303, filed Dec. 22, 2006, which claims priority to Japanese Application No. 2005-375138, filed Dec. 27, 2005, the disclosures of which are hereby incorporated by reference in their entirety.

TECHNICAL FIELD

The present invention relates to a method and apparatus for compressing three-dimensional shape data, and in particular to a data compression method and apparatus capable of compressing shape information of a multiplicity of three-dimensional objects or color information of such objects and surfaces thereof into a small data amount as a whole, and to a method and apparatus for restoring such data.

BACKGROUND ART

Recent development in the three-dimensional object shape measurement technology has made it possible to obtain highly accurate three-dimensional shape data for objects having non-geometrical, complicated free shapes (see, for example, "A Range Finder for Human Face Measurement", IEICE Technical Report, vol. 99, No. 118, PRMU 99-223, pp. 35-42 (Non-Patent Document 1)), and three-dimensional shape data is now utilized in various fields such as a graphics generation system and an image recognition system.

A complicated three-dimensional shape of an object (a human body, for example), which cannot be described by a combination of geometrical shapes such as cubes or circular cylinders, is usually represented as a set of triangular or quadrangular facets (polygons) obtained by finely dividing the object surface, and described by data formed of a series of coordinate values of the vertexes in three-dimensional space. Color information of an object surface is represented by brightness values as colors of the polygon vertexes.

According to a typical method of representing 3D data, for example, a two-dimensional coordinate system (u, v) is defined on the surface of an object in the same manner as the latitudes and longitudes are determined on the surface of the earth, the coordinates are quantized at appropriate regular intervals so that the quantized points are regarded as polygon vertexes, and the three-dimensional coordinates and color (r, g, b brightness values) thereof are stored as data. According to this method, the three-dimensional shape of an object and the color information of the surface thereof can be perceived as an image each pixel of which has six elements (x, y, z, r, g, and b).

Since three-dimensional coordinates have a wider range than brightness values, three-dimensional data has an amount of data that is several times greater than that of a brightness image having an equal level of resolution. For example, when a surface area of 30 cm×30 cm is quantized at intervals of 1 mm, data of 90,000 (resolution 300×300) vertexes is required. Even if each of x, y and z is described by two bytes, and each of r, g and b is described by one byte, the data amount exceeds 800 kilo bytes. Accordingly, in a system using three-dimensional data of a multiplicity of objects as compared with an image processing system, a problem becomes more serious about a data amount in various data processing processes such as storage, search, and network transmission of data, and, as a result, a technology to compress the data amount is required.

An example of a conventional compression apparatus compressing three-dimensional shape data for reducing the data amount of a three-dimensional shape model represented with polygons is described in W. J. Schroeder, J. A. Zarge, W. E. Lorensen, "Decimation of Triangle Meshes", Computer Graphics, 26, 2, 1992, Pages: 65-70 (Non-Patent Document 2). As shown in FIG. 22, this conventional data compression apparatus 2000 is composed of vertex selection means 2001 and vertex deletion means 2002.

The data compression apparatus 2000 thus configured operates as described below.

The vertex selection means 2001 selects such vertexes that can be deleted without causing a serious error from input three-dimensional data 2010, and the vertex deletion means 2002 deletes the selected vertexes to reduce the number of polygons to thereby generate compressed data 2020 that is three-dimensional data with a reduced data amount. According to the technology described in Non-Patent Document 2, the vertex selection means 2001 preferentially selects vertexes located at a short distance from a polygon at an averaged position of adjacent polygons, and the vertex deletion means 2002 deletes the vertexes. This operation is repeated until reaching a designated decimation rate. The compressed data 2020 finally obtained has a reduced number of vertexes and thus has a smaller data amount in comparison with the original data. There are many similar technologies for improving the method of selecting polygon to be deleted. One of such technologies is described in Japanese Patent 3341549 (Patent Document 1).

On the other hand, although not relating to data compression, an example of techniques for generating three-dimensional shape data is described in Volker Blanz, Thomas Vetter, "A Morphable Model For The Synthesis Of 3D Faces", SIGGRAPH 99 Conference Proceedings, Pages: 187-194 (Non-Patent Document 3). According to Non-Patent Document 3, a multiplicity of three-dimensional facial data sets are preliminarily collected, and corresponding points are determined between the data sets to produce vertex data. A principal component analysis is applied to compute about 100 sets of base data and the computed base data is stored. When a photograph of a face (two-dimensional image) is given, a three-dimensional data of the face represented by the two-dimensional image is synthesized based on a combination of the stored base data, and the three-dimensional data thus obtained is output.

DISCLOSURE OF THE INVENTION

Problems to be Solved by the Invention

A first problem of the prior art is that the data compression ratio is low. This is because a high compression ratio cannot be expected only by reducing polygons.

A second problem resides in that the resolution of three-dimensional data is deteriorated as the compression ratio is increased to reduce polygons. This is because the resolution, or the number of polygons of the compressed data is reduced in proportion to the compression ratio with respect to the number of polygons of the original data, and the compressed data cannot be restored any more.

A third problem is that the compression ratio cannot be increased even if the number of stored three-dimensional data sets is increased. This is because the three-dimensional data sets are each independently compressed by a same method.

A fourth problem is that an optimal compression ratio or reproducibility according to the content of three-dimensional data cannot be achieved. This is because arbitrary three-dimensional data sets are compressed by an identical method.

It is an object of the present invention to provide a data compression method and apparatus capable of achieving a high compression ratio (capable of compressing a data amount to one several hundredth or less) without deteriorating the resolution (the number of polygons) of three-dimensional data. It is particularly an object of the present invention to provide a data compression method and apparatus capable of efficiently compressing three-dimensional data of a multiplicity of similar objects such as human faces, and storing and transferring the compressed three-dimensional data.

Means for Solving the Problems

A first embodiment of a data compression apparatus of the present invention comprises: corresponding point determination means which receives three-dimensional data and generates three-dimensional data to be synthesized in which vertexes of the received three-dimensional data are associated with vertexes of three-dimensional reference data serving as a reference to determine the association relationship between the vertexes; and coefficient computation means which computes a coupling coefficient for synthesizing the three-dimensional data to be synthesized by coupling a three-dimensional base data group used for synthesis of three-dimensional data, and outputs the computed coupling coefficient as compressed data of the received three-dimensional data.

A second embodiment of the data compression apparatus according to the first embodiment of the data compression apparatus of the present invention comprises compression determination means which restores three-dimensional data from the coupling coefficient computed by the coefficient computation means and the three-dimensional base data group, compares the restored three-dimensional data with the three-dimensional data to be synthesized, and if the restoration accuracy does not satisfy a predetermined accuracy, adds new three-dimensional base data to the three-dimensional base data group used for synthesis of three-dimensional data.

A third embodiment of the data compression apparatus according to the first or second embodiment of the data compression apparatus of the present invention comprises base data selection means which selects a plurality of three-dimensional base data sets suitable for synthesis of the three-dimensional data to be synthesized from the three-dimensional base data group used for synthesis of three-dimensional data.

In a fourth embodiment of the data compression apparatus according to the second or third embodiment of the data compression apparatus of the present invention, the compressed data contains, in addition to the coupling coefficient, selection information for identifying the three-dimensional base data that has been used for coupling.

A fifth embodiment of the data compression apparatus according to the first embodiment of the data compression apparatus of the present invention comprises region dividing means for dividing the three-dimensional data to be synthesized into a plurality of subregions, and characterized in that the coefficient computation means computes, for each subregion, a coupling coefficient for coupling the three-dimensional base data group divided into a same subregion to synthesize the three-dimensional data to be synthesized, and outputs the coupling coefficient computed for each subregion as compressed data of the received three-dimensional data.

A sixth embodiment of the data compression apparatus according to the first embodiment of the data compression apparatus of the present invention comprises: region dividing means for dividing the three-dimensional data to be synthesized into a plurality of subregions; and compression determination means which restores three-dimensional data from the coupling coefficient computed by the coefficient computation means and the three-dimensional base data group, compares the restored three-dimensional data with the three-dimensional data to be synthesized, divides the three-dimensional data to be synthesized into a plurality of subregions by means of the region dividing means if the restoration accuracy does not satisfy a predetermined accuracy, computes, for each subregion, a coupling coefficient for coupling the three-dimensional base data group divided into a same subregion to synthesize the three-dimensional data to be synthesized by means of coefficient computation means, and outputs the coupling coefficient computed for each subregion as compressed data of the received three-dimensional data.

In a seventh embodiment of the data compression apparatus according to the fifth embodiment of the data compression apparatus of the present invention, if the restoration accuracy as a whole does not satisfy the predetermined accuracy even after the division is made into subregions, the compression determination means further divides the three-dimensional data to be synthesized into smaller subregions and performs control to find a coupling coefficient for each subregion.

In an eighth embodiment of the data compression apparatus according to the fifth, sixth, or seventh embodiment of the data compression apparatus of the present invention, the compressed data contains subregion determination data for identifying the subregions.

A ninth embodiment of the data compression apparatus according to any one of the first to eighth embodiments of the data compression apparatus of the present invention comprises a detachable memory device for storing the compressed data.

A first embodiment of a data restoration apparatus of the present invention comprises three-dimensional data restoration means which receives compressed data containing a coupling coefficient, and restores three-dimensional data by coupling a plurality of three-dimensional base data sets used for synthesis, using the coupling coefficient contained in the compressed data.

A second embodiment of the data restoration apparatus of the present invention comprises: base data retrieval means which receives compressed data containing a coupling coefficient and selection information of a three-dimensional base data group which has been used for synthesis, and extracts, from a predetermined three-dimensional base data group, the three-dimensional base data group which has been used for synthesis of three-dimensional data to be compressed based on the selection information; and three-dimensional data restoration means which restores three-dimensional data by coupling the extracted three-dimensional base data group, using the coupling coefficient contained in the compressed data.

A third embodiment of the data restoration apparatus of the present invention comprises: base data retrieval means which receives compressed data containing a coupling coefficient for each subregion and subregion determination data identifying a subregion of three-dimensional base data group which has been used for synthesis, and extracts, from a predetermined three-dimensional base data group, a subregion of the three-dimensional base data group used for synthesis of three-dimensional data to be compressed, based on the subregion determination data; and three-dimensional data restoration means which restores three-dimensional data by coupling the extracted three-dimensional base data group of each same subregion, using the coupling coefficient for each subregion contained in the compressed data.

A fourth embodiment of the data restoration apparatus according to the first, second, or third aspect of the data restoration apparatus of the present invention comprises a detachable memory device for storing the compressed data.

A compression/restoration system according to the present invention comprises: a compression/restoration apparatus having a data compression apparatus according to any one of the first to eighth embodiments of the data compression apparatus, and a data restoration apparatus according to the first, second, or third embodiment of the data restoration apparatus; and a memory device for storing compressed data generated by the compression/restoration apparatus.

A first embodiment of a data transmission apparatus of the present invention comprises: a data compression apparatus according to any one of the first to eighth embodiment of the data compression apparatus; a memory device for storing three-dimensional reference data and a three-dimensional base data group used by the data compression apparatus; and data transfer means for transmitting compressed data generated by the data compression apparatus.

In a second embodiment of the data transmission apparatus according to the first embodiment of the data transmission apparatus of the present invention, the data transfer means transfers three-dimensional base data added to the three-dimensional base data group by the data compression apparatus, to a transmission destination of compressed data.

A first embodiment of a data reception apparatus of the present invention comprises: a data restoration apparatus according to the first, second, or third embodiment of the data restoration apparatus;

a memory device for storing a three-dimensional base data group used by the data restoration apparatus; and data transfer means for receiving compressed data and outputting the same to the data restoration apparatus.

In a second embodiment of the data reception apparatus according to the first embodiment of the data reception apparatus of the present invention, when receiving additional three-dimensional base data, the data transfer means adds the same to the three-dimensional base data group.

In a data transfer system of the present invention, the data transmission apparatus according to claim 15 or 16 and the data reception apparatus according to claim 17 or 18 are connected to each other through a communication path.

A first embodiment of a data compression method of the present invention comprises: a step (a) in which corresponding point determination means receives three-dimensional data and generates three-dimensional data to be synthesized in which vertexes of the received three-dimensional data are associated with vertexes of three-dimensional reference data serving as a reference for determining association relationship between the vertexes; and a step (b) in which coefficient computation means computes a coupling coefficient for coupling a three-dimensional base data group used for synthesis of three-dimensional data to synthesize the three-dimensional data to be synthesized, and outputs the computed coupling coefficient as compressed data of the received three-dimensional data.

A second embodiment of the data compression method according to the first embodiment of the data compression method of the present invention comprises a step (c) in which compression determination means restores three-dimensional data from the coupling coefficient computed in the step (b) and the three-dimensional base data group, compares the restored three-dimensional data with the three-dimensional data to be synthesized, and adds new three-dimensional base data to a three-dimensional base data group used for synthesis of three-dimensional data if the restoration accuracy does not satisfy a predetermined accuracy.

A third embodiment of the data compression method according to the first or second embodiment of the data compression method of the present invention comprises a step (d) in which base data selection means selects a plurality of three-dimensional base data sets suitable for synthesis of the three-dimensional data to be synthesized from a three-dimensional base data group used for synthesis of three-dimensional data.

In a fourth embodiment of the data compression method according to the second or third embodiment of the data compression method of the present invention, the compressed data contains selection information for identifying three-dimensional base data which has been used for synthesis, in addition to the coupling coefficient.

A fifth embodiment of the data compression method of the present invention comprises: a step (a) in which corresponding point determination means receives three-dimensional data, and generates three-dimensional data to be synthesized in which vertexes of the received three-dimensional data are associated with vertexes of three-dimensional reference data serving as a reference for determining association relationship between vertexes; a step (b) in which region dividing means divides the three-dimensional data to be synthesized into a plurality of subregions; and a step (c) in which coefficient computation means computes, for each subregion, a coupling coefficient for coupling a three-dimensional base data group used for synthesis of three-dimensional data and divided into a same subregion to synthesize the three-dimensional data to be synthesized, and outputs the coupling coefficient computed for each subregion as compressed data of the received three-dimensional data.

A sixth embodiment of the data compression method of the present invention comprises: a step (a) in which corresponding point determination means receives three-dimensional data and generates three-dimensional data to be synthesized in which vertexes of the received three-dimensional data are associated with vertexes of three-dimensional reference data serving as a reference for determining association relationship between vertexes; a step (b) in which coefficient computation means computes a coupling coefficient for coupling a three-dimensional base data group used for synthesis of three-dimensional data to synthesize the three-dimensional data to be synthesized, and outputs the computed coupling coefficient as compressed data of the received three-dimensional data; and a step (c) in which compression determination means restores three-dimensional data from the coupling coefficient computed in the step (b) and the three-dimensional base data group, compares the restored three-dimensional data with the three-dimensional data to be synthesized, and divides the three-dimensional data to be synthesized into a plurality of subregions by means of the region dividing means if the restoration accuracy does not satisfies a predetermined accuracy, computes, for each subregion, a coupling coefficient for coupling a three-dimensional base data group divided into a same subregion to synthesize the three-dimensional data to be synthesized by means of the coefficient computation means, and outputs the coupling coefficient computed for each subregion as compressed data of the received three-dimensional data.

In a seventh embodiment of the data compression method according to the sixth embodiment of the data compression method of the present invention, when the restoration accuracy as a whole does not satisfies the predetermined accuracy even after the division into subregions, the three-dimensional data to be synthesized is further divided into smaller subregions and a coupling coefficient is found for each subregion.

In an eighth embodiment of the data compression method according to the fifth, sixth, or seventh embodiment of the data compression method of the present invention, the compressed data contains subregion determination data for identifying the subregions.

In a ninth embodiment of the data compression method according to any one of the first to eighth embodiments of the data compression method of the present invention, the compressed data is stored in a detachable memory device.

In a first embodiment of a data restoration method of the present invention, three-dimensional data restoration means receives compressed data containing a coupling coefficient, and restores three-dimensional data by coupling a plurality of three-dimensional base data sets which have been used for synthesis, using the coupling coefficient contained in the compressed data.

A second embodiment of the data restoration method of the present invention comprises: a step (a) in which base data retrieval means receives compressed data containing a coupling coefficient and selection information of a three-dimensional base data group that has been used for synthesis, and extracts the three-dimensional base data group that has been used for synthesis of three-dimensional data to be compressed from a predetermined three-dimensional base data group, based on the selection information; and a step in which three-dimensional data restoration means restores three-dimensional data by coupling the extracted three-dimensional base data group, using the coupling coefficient contained in the compressed data.

A third embodiment of the data restoration method of the present invention comprises: a step (a) in which base data retrieval means receives compressed data containing a coupling coefficient for each subregion and subregion determination data for identifying a subregion of a three-dimensional base data group that has been used for synthesis, and extracts, from a predetermined three-dimensional base data group, a subregion of the three-dimensional base data group that has been used for synthesis of three-dimensional data to be compressed based on the subregion determination data; and a step (b) in which three-dimensional data restoration means restores three-dimensional data by coupling the extracted three-dimensional base data group of each same subregion, using the coupling coefficient for each subregion contained in the compressed data.

In a fourth embodiment of the data restoration method according to the first, second, or third embodiment of the data restoration method, the compressed data is input from a detachable memory device.

In a compression/restoration method of the present invention, compressed data generated by any one of the first to eight embodiments of the data compression method is stored in a memory device, and compressed data retrieved from the memory device is restored to three-dimensional data by the first, second, or third embodiment of the data restoration method.

In a first embodiment of a data transmission method of the present invention, compressed data generated by any one of the first to eight embodiments of the data compression method is transferred by means of data transfer means.

In a second embodiment of the data transmission method according to the first embodiment of the data transmission method of the present invention, the data transfer means transfers three-dimensional base data added to the three-dimensional base data group in the data compression method, to a transmission destination of compressed data.

In a first embodiment of a data reception method of the present invention, compressed data received by data transfer means is restored to three-dimensional data by the first, second, or third embodiment of the data restoration method.

In a second embodiment of the data reception method according to the first embodiment of the data reception method of the present invention, when receiving additional three-dimensional base data, the data transfer means adds the same to a three-dimensional base data group used in the data restoration method.

In a data transfer method of the present invention, the first or second embodiment of the data transmission method is combined with the first or second embodiment of the data reception method.

The present invention efficiently compresses input three-dimensional data with the use of separate three-dimensional data. Specifically, with reference to three-dimensional reference data, corresponding vertexes are determined between the input three-dimensional data and a three-dimensional base data group, and a coupling coefficient is computed for linearly coupling all the data sets in the three-dimensional base data group or some data sets selected from the three-dimensional base data group to thereby synthesize the same three-dimensional data as the input three-dimensional data. This coupling coefficient is used as compressed data of the input three-dimensional data. When restoring the data, the three-dimensional base data used for synthesis is coupled according to the coupling coefficient indicated by the compressed data to restore the original three-dimensional data.

Thus, the present invention utilizes the fact that the data amount of the coupling coefficient for coupling the three-dimensional base data group is much smaller than the data amount of the original three-dimensional data. Unlike Non-Patent Document 3, three-dimensional data is input, and a coupling coefficient is computed for synthesizing this input three-dimensional data by combination of a three-dimensional base data group. By using the coupling coefficient in place of the input three-dimensional data, the data amount required for storing or transferring three-dimensional data can be reduced. Further, the three-dimensional base data group used for computation of a coupling coefficient may be base data computed from a plurality of previously collected three-dimensional data sets by principal component analysis, or may be three-dimensional data itself.

Advantageous Effects of the Invention

A first effect is that three-dimensional data can be compressed at a remarkably high compression ratio. This is because three-dimensional shape data consisting of as many as several tens thousands to several hundreds thousands sets of vertex data can be compressed into data consisting of about several hundreds of coupling coefficients, and thus the data amount can be compressed to one several hundredth or less.

A second effect is that the resolution of compressed three-dimensional data is not reduced. This is because the restored three-dimensional data exhibits the same resolution as that of three-dimensional base data used for synthesis, and if these resolutions are equally high as or higher than the resolution of the original three-dimensional data, the resolution is not reduced.

A third effect resides in that, in a database system for storing a large volume of three-dimensional data, for example, a memory capacity required for storing or transferring newly added data can be reduced substantially. This is because new data can be additionally stored by converting the new data into a coupling coefficient by using existing data as three-dimensional base data, and storing the coupling coefficient.

A fourth effect resides in that the employment of a design to select and use optimal base data according to input three-dimensional data makes it possible to minimize the amount of computation required for data compression and deterioration in accuracy of restored data.

A fifth effect has confidentiality of compressed data. This is because the original three-dimensional data cannot be restored by using only the coupling coefficient.

LIST OF REFERENCE NUMERALS

Figure 1:
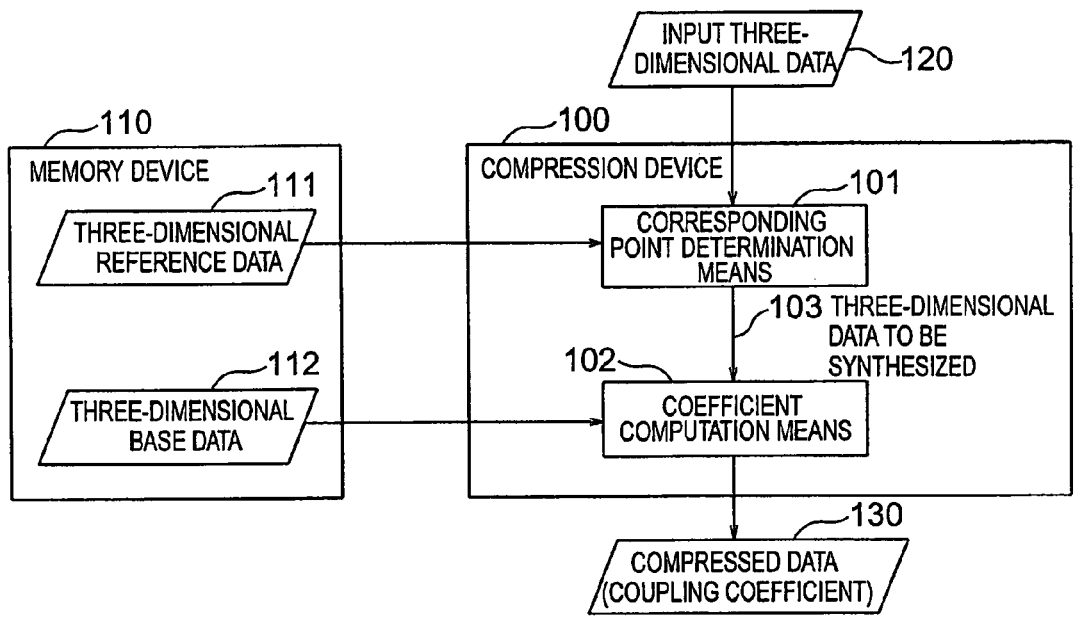
FIG. 1 is a block diagram showing a first embodiment of a data compression apparatus according to the present invention.

100: Compression apparatus
101: Corresponding point determination means
102: Coefficient computation means
103: Three-dimensional data to be synthesized
110: Memory device
111: Three-dimensional reference data
112: Three-dimensional base data group
120: Input three-dimensional data
130: Compressed data

BEST MODE FOR CARRYING OUT THE INVENTION

Embodiments of the present invention will be described in detail with reference to the drawings.

First Embodiment of Data Compression Apparatus

Referring to FIG. 1, a first embodiment of a data compression apparatus according to the present invention is composed of a compression device 100 and a memory device 110 connected thereto. The compression device 100 receives three-dimensional data 120 representing a shape of an object and outputs compressed data 130 obtained by compressing the three-dimensional data 120.

In the memory device 110, three-dimensional reference data 111 and a three-dimensional base data group 112 are preliminarily stored. According to the present invention, coupling coefficients for linearly coupling a plurality of three-dimensional data sets to synthesize the three-dimensional data 120 are used as compressed data of the three-dimensional data 120. Therefore, vertexes of the plurality of three-dimensional data sets used in the synthesis must be made to correspond to those of the input three-dimensional data 120. The three-dimensional reference data 111 stored in the memory device 110 is three-dimensional data used as a reference when determining such correspondence relationship between the vertexes. The three-dimensional base data group 112 corresponds to the plurality of three-dimensional data sets used in the synthesis. Each of the three-dimensional base data sets is three-dimensional data itself generated by making vertexes of three-dimensional data of an object correspond to the vertexes of the three-dimensional reference data 111, or base data obtained by computation such as principal component analysis on the basis of the three-dimensional data thus generated for a multiplicity of objects.

The compression device 100 has corresponding point determination means 101 for producing three-dimensional data to be synthesized 103 in which the vertexes of the three-dimensional reference data 111 are made to correspond to the vertexes of the input three-dimensional data 120, and coefficient computation means 102 for computing coupling coefficients used for coupling a plurality of three-dimensional base data sets included in the three-dimensional base data group 112 to synthesize the three-dimensional data to be synthesized 103, and outputting the coupling coefficient obtained by the computation as compressed data 130 of the input three-dimensional data 120.

Figure 2:
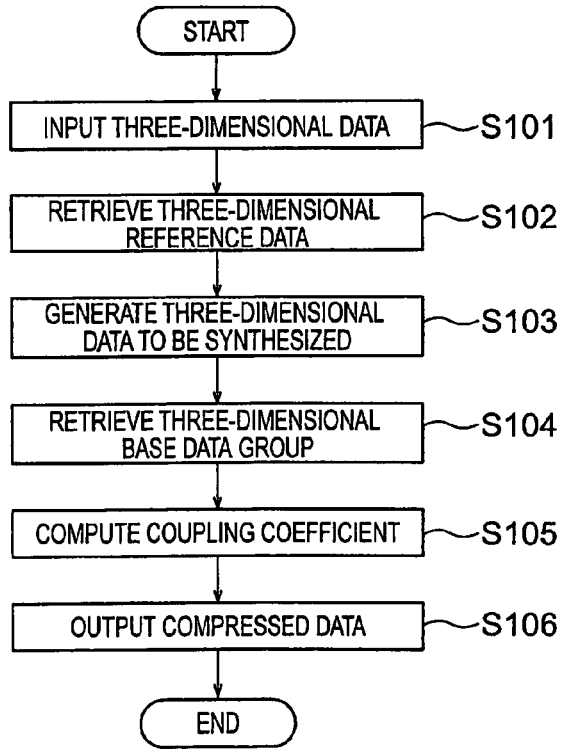
FIG. 2 is a flowchart showing an example of processing by the first embodiment of the data compression apparatus according to the present invention.

FIG. 2 shows a flow of processing by the data compression apparatus of this embodiment. Processing operation of the data compression apparatus shown in FIG. 1 will be described with reference to FIG. 2 in addition to FIG. 1. Firstly, the corresponding point determination means 101 of the compression device 100 receives three-dimensional data 120 and retrieves three-dimensional reference data 111 from the memory device 110 (steps S101 and S102) to produce three-dimensional data to be synthesized 103 in which the vertexes of the three-dimensional data 120 are made to correspond to those of the three-dimensional reference data 111 (step S103). Subsequently, the coefficient computation means 102 retrieves or read out the three-dimensional base data group 112 from the memory device 110 (step S104), and computes coupling coefficients for coupling the three-dimensional base data group to synthesize the three-dimensional data to be synthesized 103 (step S105). The coefficient computation means 102 then outputs the computed coupling coefficient as compressed data 130 of the three-dimensional data 120 (step S106).

Operation of the data compression apparatus according to this embodiment will be described in more detail.

Firstly, three-dimensional data 120 to be compressed is input (step S101). While the three-dimensional data 120 to be compressed may be of a variety of types, description herein will be made of an example in which three-dimensional data of a human face is compressed. The three-dimensional data may be input by various methods, one of which is a method of measuring with the use of a three-dimensional measurement device. This can be done, for example, by using a measurement apparatus employing the measurement technology described in Non-Patent Document 3. Three-dimensional data obtained by this technology is polygon data having three-dimensional coordinates and brightness values of a texture (surface color) image for a multiplicity of measurement points (vertexes). An example is taken in the description below in which the input three-dimensional data 120 has 100,000 vertexes, and the respective xyz values of the three-dimensional coordinates are represented in 16-bit floating point format, while respective rgb values of the texture brightness values are represented in 8-bit integer format. In this case, the input three-dimensional data 120 has a data amount of 100000×(3×2+3×1) bytes, that is, about 900 kilobytes.

Subsequently, three-dimensional reference data 111 functioning as a reference for determining correspondence relationship between the vertexes is read out from the memory device 110 (step S102). The three-dimensional reference data 111 may be three-dimensional facial data of one specific person, or an average value of three-dimensional facial data of a plurality of persons such as those used for producing the three-dimensional base data group 112. Description is made about an example in which the three-dimensional reference data 111 has 90,000 vertexes and, like the input three-dimensional data 120, the three-dimensional coordinates in a unit of mm are represented in three 16-bit floating point formats, while the texture brightness values are represented by three RGB brightness values (0 to 255) in 8-bit integer formats. When three-dimensional coordinates of an i-th vertex of the three-dimensional reference data 111 are denoted by (xri, yri, zri), and the texture brightness values are denoted by (rri, gri, bri), the three-dimensional reference data 111 can be represented as follows as a vector data set in which the three-dimensional shape and the texture image are respectively represented by a series of the coordinate values and the brightness values of the vertexes.

$$Sr=[xr1,yr1,zr1,xr2,yr2,zr2,\ldots,xr90000,yr90000, zr90000] \quad (1)$$

$$Tr=[rr1,gr1,br1,rr2,gr2,br2,\ldots,rr90000,gr90000, br90000] \quad (2)$$

In the next step, vertexes of the input three-dimensional data 120 corresponding to the respective vertexes of the three-dimensional reference data 111 are determined (step S103). While various methods are applicable to this, a method of finding a vertex having a closest texture brightness value to the three-dimensional coordinates may be used. For example, three-dimensional coordinates of a j-th vertex of the input three-dimensional data 120 is denoted by (xtj, ytj, ztj) and texture brightness is denoted by (rtj, gtj, btj), and a cost function C is defined as an equation below.

$$C(i,j)=\{(xri-xtj)^2+(yri-ytj)^2+(zri-ztj)^2\}+w\{(rri-rtj)^2+ (gri-gtj)^2+(bri-btj)^2\} \quad (3)$$

A vertex of the input three-dimensional data 120 corresponding to the i-th (i=1, . . . , 90000) vertex of the three-dimensional reference data 111 can be determined by finding a vertex j which minimizes the cost function C(i,j) from among the vertexes of the input data 120. It is also possible to enhance the accuracy by defining a vertex obtained by averaging a plurality of vertexes having a relatively small value of C, as a corresponding point. Various values may be used as weight w, for example, w=1.0.

In the three-dimensional data to be synthesized 103 for which corresponding points have been determined, the three-dimensional shape data and the texture image data are each represented as a vector data set formed by a series of coordinate values or brightness values of the vertexes. Specifically, when a vertex of the input three-dimensional data 120 corresponding to the vertex i of the three-dimensional reference data 111 is denoted by j(i), the shape and texture of the three-dimensional data to be synthesized can be represented by the following vector St and vector Tt, respectively.

$$St=[xrj(1),yrj(1),zrj(1),xrj(2),yrj(2),zrj(2),\ldots,xrj (90000),yrj(90000),zrj(90000)] \quad (4)$$

$$Tt=[rrj(1),grj(1),brj(1),rrj(2),grj(2),brj(2),\ldots,rrj (90000),grj(90000),brj(90000)] \quad (5)$$

In the next step, three-dimensional base data group 112 which is a three-dimensional data group of a predetermined sufficient number of objects is read from the memory device 110 (step S104). The three-dimensional base data group 112 may be of any one of the following types: a) three-dimensional data type in which all the three-dimensional base data sets forming the three-dimensional base data group 112 use three-dimensional data of a human face itself; b) base data type in which all the three-dimensional base data sets forming the three-dimensional base data group 112 are base data sets obtained by computation based on collected three-dimensional data sets of a multiplicity of human faces (for example, as described in Non-Patent Document 3, averaged three-dimensional data and base data obtained by principal component analysis can be used); c) mixed type in which some of the three-dimensional base data sets forming the three-dimensional base data group 112 are base data sets obtained by computation based on collected three-dimensional data sets of a multiplicity of human faces, and the rest of the three-dimensional base data sets are three-dimensional data of human faces themselves.

Whichever type the three-dimensional base data group 112 is selected, the three-dimensional base data group 112 has already been processed in the same manner as the corresponding point determination processing in step S104. In the description here, the three-dimensional base data group 112 of the three-dimensional data type will be used. The three-dimensional shape and texture of the three-dimensional base data group 112 are represented by vectors. When a vertex corresponding to the vertex j of the three-dimensional reference data 111 is denoted by j(i), the three-dimensional shape Sbk and the texture Tbk of a k-th three-dimensional base data set are represented as follows.

$$Sbk = [xbkj(1), ybkj(1), zbkj(1), xbkj(2), ybkj(2), zbkj(2), \ldots, xbkj(90000), ybkj(90000), zbkj(90000)] \quad (6)$$

$$Tbk = [rbkj(1), gbkj(1), bbkj(1), rbkj(2), gbkj(2), bbkj(2), \ldots, rbkj(90000), gbkj(90000), bbkj(90000)] \quad (7)$$

As the number of three-dimensional base data sets is increased, the accuracy of three-dimensional data restored from compressed data is enhanced, but the computation amount and the memory amount required for data compression are increased. In the description here, data sets prepared by collecting three-dimensional facial data for 100 persons are used as an example.

In the next step, a coefficient for synthesizing the three-dimensional data to be synthesized 103 is computed with the use of the three-dimensional base data group 112 (step S105). When n (n=100, for example) sets of three-dimensional base data are used, n coefficients $\{\alpha sk\}, \{\alpha tk\}$ (k=1, ..., 100) describing the shape and texture of the three-dimensional data to be synthesized 103 are found by the linear least square method represented by the following equations.

$$\{\alpha_{sk}\} = \operatorname{argmin} \left| S_t - \sum_{k=1}^{100} (\alpha_{sk} S_{bk}) \right|^2 \quad (8)$$

$$\{\alpha_{tk}\} = \operatorname{argmin} \left| T_t - \sum_{k=1}^{100} (\alpha_{tk} T_{bk}) \right|^2 \quad (9)$$

The computed coefficient data $\{\alpha sk\}, \{\alpha tk\}$ is then output as the compressed data 130 of the input three-dimensional data 120 (step S106). When the coefficient data is obtained in 16-bit floating point format, for example, the data amount of the coefficient data will be 2×10×2=400 bytes.

First Embodiment of Data Restoration Apparatus

Description will be made of an example of configuration of a data restoration apparatus for restoring original three-dimensional data from compressed data generated by the data compression apparatus of the first embodiment shown in FIG. 1.

Figure 3:
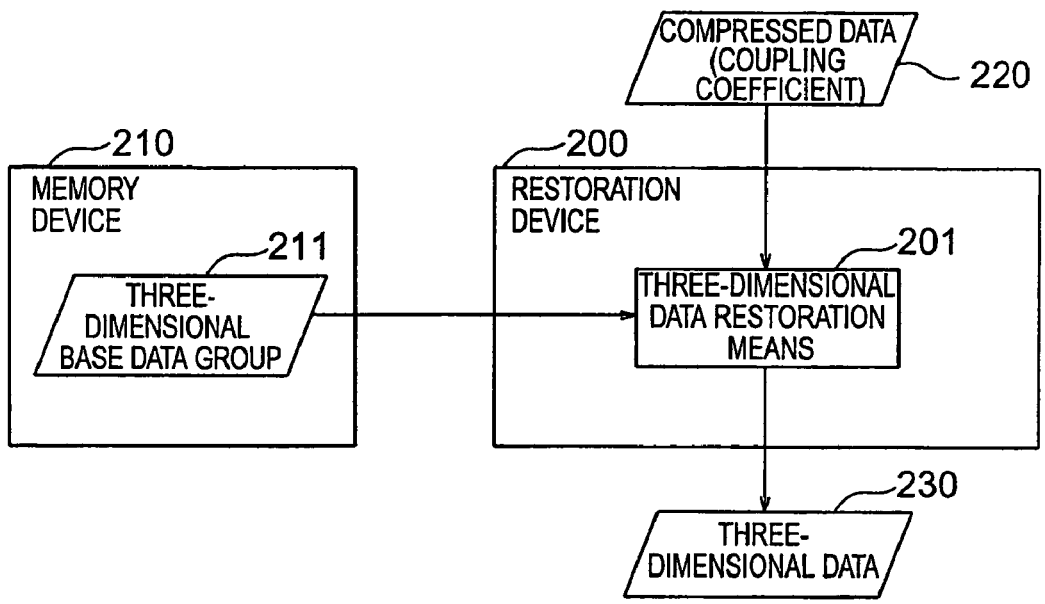
FIG. 3 is block diagram showing a first embodiment of a data restoration apparatus according to the present invention.

Referring to FIG. 3, a first embodiment of a data restoration apparatus is composed of a restoration device 200 which receives compressed data 220 of three-dimensional data representing a shape of an object and outputs original three-dimensional data, and a memory device 210 connected thereto.

The memory device 210 preliminarily stores a three-dimensional base data group 211 which is identical to the three-dimensional base data group 112 in the data compression apparatus shown in FIG. 1.

The restoration device 200 has three-dimensional data restoration means 201 which receives compressed data 220 corresponding to the compressed data 130 in the data compression shown in FIG. 1, generates three-dimensional data in which the three-dimensional base0 data group 211 is coupled by means of a coupling coefficient indicated by the compressed data 220, and outputs the same.

Figure 4:
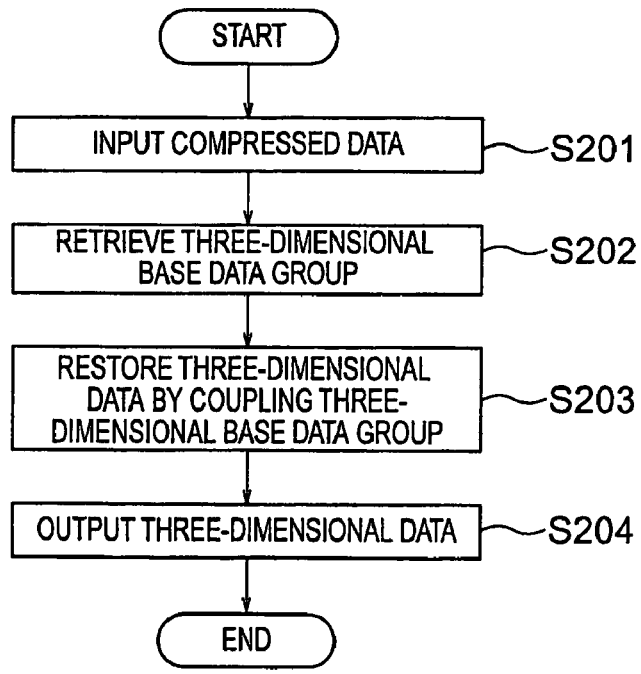
FIG. 4 is a flowchart showing an example of processing by the first embodiment of the data restoration apparatus according to the present invention.

FIG. 4 shows a flow of processing carried out by the data restoration apparatus of this embodiment. The three-dimensional data restoration means 201 of the restoration device 200 receives the compressed data 220 and reads the three-dimensional base data group 211 from the memory device 210 (steps S201 and S202). The three-dimensional data restoration means 201 then couples the three-dimensional base data group 211 according to the coupling coefficients indicated by the compressed data 220 to restore the three-dimensional data and outputs the restored data (steps S203 and S204).

When the compressed data 220 is detnoed as $\{\alpha sk\}, \{\alpha tk\}$ (k=1, ..., 100), and the three-dimensional shape and texture of the three-dimensional base data group 211 are denoted as Sbk and Tbk represented by the equations (6) and (7) above, respectively, vectors St' and Tt' representing the three-dimensional shape and texture of the three-dimensional data to be restored are computed using the following equations.

$$S'_t = \sum_{K=1}^{100} (\alpha_{sk} S_{bk}) \quad (10)$$

$$T'_t = \sum_{K=1}^{100} (\alpha_{tk} T_{bk}) \quad (11)$$

Description will be made of effects provided by the data compression apparatus of FIG. 1 and the data restoration apparatus of FIG. 3.

The data compression apparatus according to the first embodiment is designed such that coefficient data for restoring the three-dimensional data 120 with the use of the three-dimensional base data group 112 is generated as compressed data of the three-dimensional data 120. Since the data amount of the coefficient data is much smaller than that of three-dimensional data, a high compression ratio can be realized. In the example used in the description here, the data amount of the input three-dimensional data is 900 kilobytes, whereas the data amount of the coefficient data is as small as 400 bytes.

Further, the data restoration apparatus according to the first embodiment is designed such that the three-dimensional data 230 to be restored is computed by combination of the three-dimensional base data groups 211, and the number of vertexes is equal to the number of three-dimensional base data groups 211. Therefore, even though a very high compression ratio is achieved, the resolution is not deteriorated by reduction of the number of vertexes due to data compression and restoration. In the example described here, since the input three-dimensional data before compression has 100,000 vertexes and the three-dimensional data to be compressed has 90,000 vertexes, the restored three-dimensional data has 90,000 vertexes. When 100,000 vertexes are reduced to 90,000 vertexes in the prior art, the data amount is reduced by only 10%. According to the present invention, in contrast, a much higher compression ratio can be realized.

It should be understood that the number of vertexes of the input three-dimensional data, the number of three-dimensional base data sets, the number of vertexes of the of the three-dimensional reference data, the number of shape data sets or brightness data sets, and the number of bits thereof are just an example and may be changed variously. This applies to the description of other embodiments below.

Second Embodiment of Data Compression Apparatus

Figure 5:
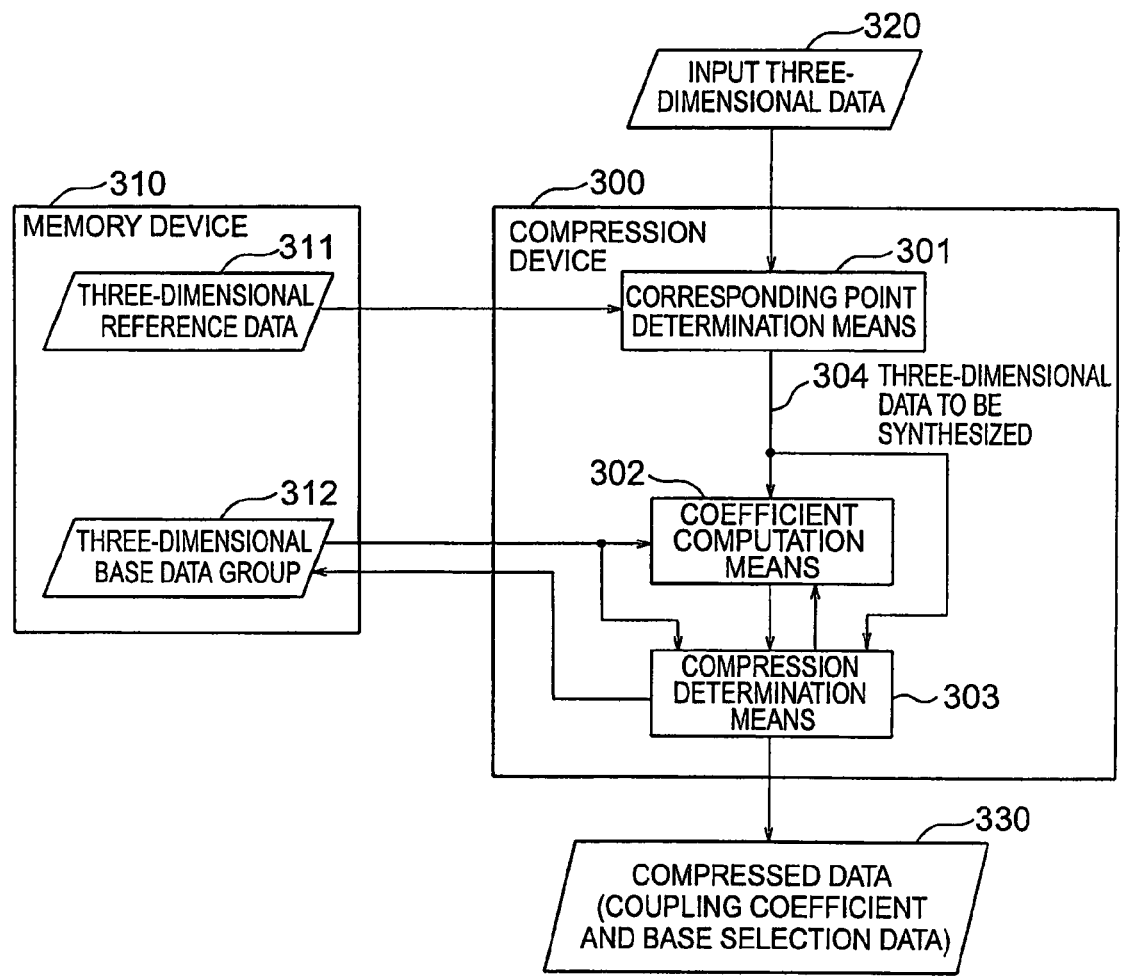
FIG. 5 is a block diagram showing a second embodiment of the data compression apparatus according to the present invention.

Referring to FIG. 5, a second embodiment of the data compression apparatus is different from the data compression apparatus according to the first embodiment shown in FIG. 1 in that a compression device 300 has compression determination means 303 in addition to corresponding point determination means 301 and coefficient computation means 302.

The compression determination means 303 restores three-dimensional data from coupling coefficients computed by the coefficient computation means 302 and a three-dimensional base data group 312, and compares this restored three-dimensional data with three-dimensional data to be synthesized 304. If the restoration accuracy does not satisfy a predetermined accuracy, the three-dimensional data to be synthesized 304 is added to the three-dimensional base data group 312 and then the coefficient computation means 302 again performs the computation. When the restoration accuracy satisfies the predetermined accuracy, the coupling coefficients used for the computation by the coefficient computation means 302 and base selection data for identifying the three-dimensional base data group 312 used in the synthesis are output as compressed data 330.

The input three-dimensional data 320, the three-dimensional reference data 311, and the three-dimensional base data group 312 are the same as the input three-dimensional data 120, the three-dimensional reference data 111, and the three-dimensional base data group 112 of FIG. 1, respectively. The corresponding point determination means 301 and the coefficient computation means 302 are the same in terms of functions as the corresponding point determination means 101 and the coefficient computation means 102 of FIG. 1.

Figure 6:
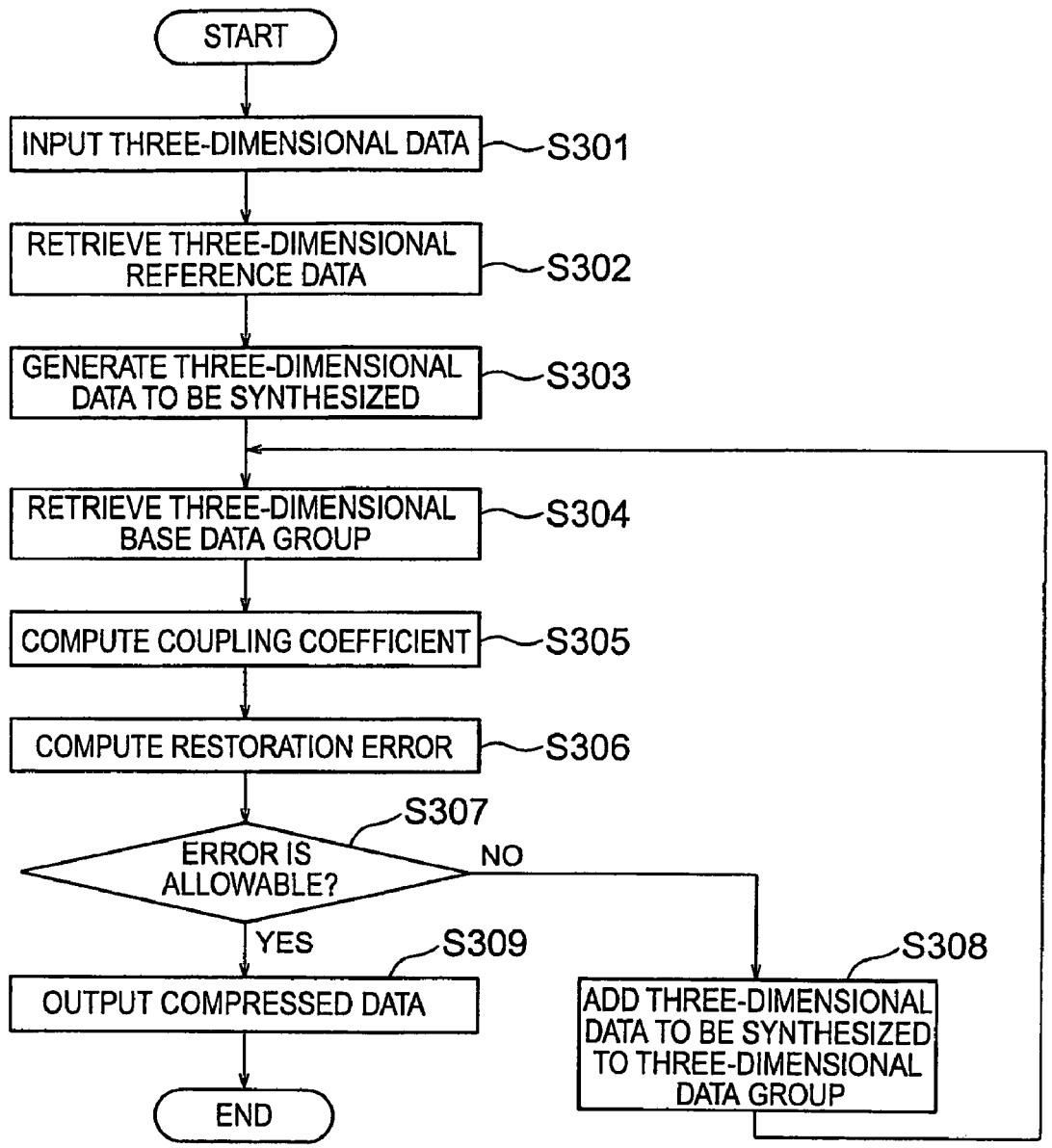
FIG. 6 is a flowchart showing an example of processing by the second embodiment of the data compression apparatus according to the present invention.

FIG. 6 shows a flow of processing carried out by the data compression apparatus of the second embodiment. Firstly, the corresponding point determination means 301 of the compression device 300 receives three-dimensional data 320 and reads out three-dimensional reference data 311 from the memory device 310. The corresponding point determination means 301 generates three-dimensional data to be synthesized 304 in which vertexes of the three-dimensional reference data 311 are associated with vertexes of the input three-dimensional data 320 (steps S301 to S303). The coefficient computation means 302 then reads the three-dimensional base data group 312 from the memory device 310, and computes coupling coefficients for coupling the three-dimensional base data group 312 to synthesize the three-dimensional data to be synthesized 304 (steps S304 and S305). The processing steps so far are the same as the operation of the data compression apparatus according to the first embodiment shown in FIG. 1.

The compression determination means 303 then restores three-dimensional data (St' and Tt') by using the equations (10) and (11) described above, when the coupling coefficient computed by the coefficient computation means 302 is denoted by $\{\alpha sk\}$, $\{\alpha tk\}$ (k=1, . . . , 100), and the three-dimensional base data group used in the synthesis is denoted by Sbk and Tbk represented by the equations (6) an (7) above, and computes an error between the restored three-dimensional data and the three-dimensional data to be synthesized (St and Tt) 304 (step S306). While various criteria are envisageable for determining an error, one example is given by a value E which is obtained by the following equation as a weighted sum of squares of an error in distance of three-dimensional coordinates and brightness between corresponding vertexes.

$$E=|St-St'|^2+we|Tt-Tt'|^2 \qquad (12)$$

While various values may be used as a weight coefficient we, a value of 1.0 is used as an example. When the present invention is used for improving the texture reproducibility, a greater value should be used as the weight coefficient we.

The compression determination means 303 then determines whether or not the value of the error E is smaller than a predetermined threshold value. If the error is too great (NO in step S307), the three-dimensional data to be synthesized (St and Tt) 304 is added to the three-dimensional base data group 312 (step S308), so that coefficient computation means 302 computes the coupling coefficient again based on the three-dimensional base data group 312 after the addition (step S304). If the error E is not greater than the predetermined threshold value (YES in step S307), the coupling coefficient computed by the coefficient computation means 302 and base selection data for identifying the three-dimensional base data group 312 used in the synthesis are output as compressed data 330 (step S309).

The addition of new three-dimensional data to the three-dimensional base data group 312 in step S308 is specifically performed in a method as described below.

a) Method 1

When the three-dimensional base data group 312 is of the three-dimensional data type in which all the three-dimensional base data sets forming the three-dimensional base data group 312 use three-dimensional facial data itself, a new three-dimensional data set is added to the three-dimensional base data group 312 as the last data set. For example, when the three-dimensional base data group 312 has 100 three-dimensional data sets numbered from first to 100th, a new three-dimensional data set is added as the 101st data set. If the original 100 three-dimensional data sets can be restored with a sufficient accuracy, the compressed data 330 includes data for selecting the first to 100th three-dimensional base data sets. If the 101 three-dimensional data sets including the added one can be restored with a sufficient accuracy, the compressed data 330 contains data for selecting the first to 101st three-dimensional base data sets.

b) Method 2

When the three-dimensional base data group 312 is of the base data type in which all the three-dimensional base data sets forming the three-dimensional base data group 312 are obtained by computation based on three-dimensional facial data of a multiplicity of human faces and the base data sets thus obtained are used, and this type is to be maintained, a new three-dimensional data set is added to the three-dimensional data group which is used when computing the original three-dimensional base data group and computations such as principal component analysis and so on are performed again to generate a new three-dimensional base data group. In this case, since there is one additional three-dimensional base data group, the compressed data 330 contains data indicating which three-dimensional base data group was used, as base selection data. When re-computing the three-dimensional base data group, the number of the three-dimensional base data sets may be made greater than before or may be left unchanged.

c) Method 3

When the three-dimensional base data group 312 is of the base data type in which all the three-dimensional base data sets forming the three-dimensional base data group 312 are base data sets obtained by computation from three-dimensional facial data of a multiplicity of human faces and the base data sets thus obtained are used, and this type is to be changed to a mixed type, or when the three-dimensional base data group 312 is already of a mixed type, a new three-dimensional data set itself is added as a new three-dimensional base data set like the method 1. In this case, since there is one additional three-dimensional base data, the compressed data 330 contains data indicating which three-dimensional base data group was used, as base selection data.

The methods 1 to 3 have each advantages and disadvantages. The methods 1 and 3 have advantages that no computation time is required for performing principal component analysis, and only one three-dimensional data set added to the base need be stored. Further, in a data transmission system to be described later, the methods 1 and 3 have an advantage that the three-dimensional data set only need be transferred to the restoration side. Although, in this embodiment, the three-dimensional data to be synthesized 304 derived from the input three-dimensional data 320 is added as a new three-dimensional base data set, one or more three-dimensional data sets stored in the memory device 310 may be added. In this case, no more three-dimensional data sets need be stored since they are already stored. Further, in a data transmission system to be described later, even transfer of three-dimensional data sets is not required if the same data sets are stored in the restoration side. However, the methods 1 and 3 have disadvantages that more time is required for the restoration computation using the equations (10) and (11) in comparison with the method 2.

The method 2 has an advantage that the computation of the equations (8) and (9) can be performed rapidly, but obviously takes time to compute the principal component analysis. Further, if all the bases are recomputed, all the bases (Sb1 to Sb100) will be changed. When restoring data by using the equations (10) and (11), the same three-dimensional base data set as the one used for computing the coefficient data is required. Therefore, all these 100 bases have to be additionally stored, and, in the data transmission system to be described later, all these 100 bases need be transferred to the restoration side. Accordingly, the method 2 has a disadvantage that an enormous amount of base data has to be stored.

Effects of the data compression apparatus according to the second embodiment will be described.

The data compression apparatus according to the second embodiment is designed such that, even if it is difficult to previously prepare three-dimensional base data sets capable of describing a variety of input three-dimensional data with a sufficient accuracy, three-dimensional base data sets are added as required while the system is operated. Accordingly, even if the three-dimensional base data sets previously prepared are not sufficient, data compression can be performed without deteriorating the accuracy.

Third Embodiment of Data Compression Apparatus

Figure 7:
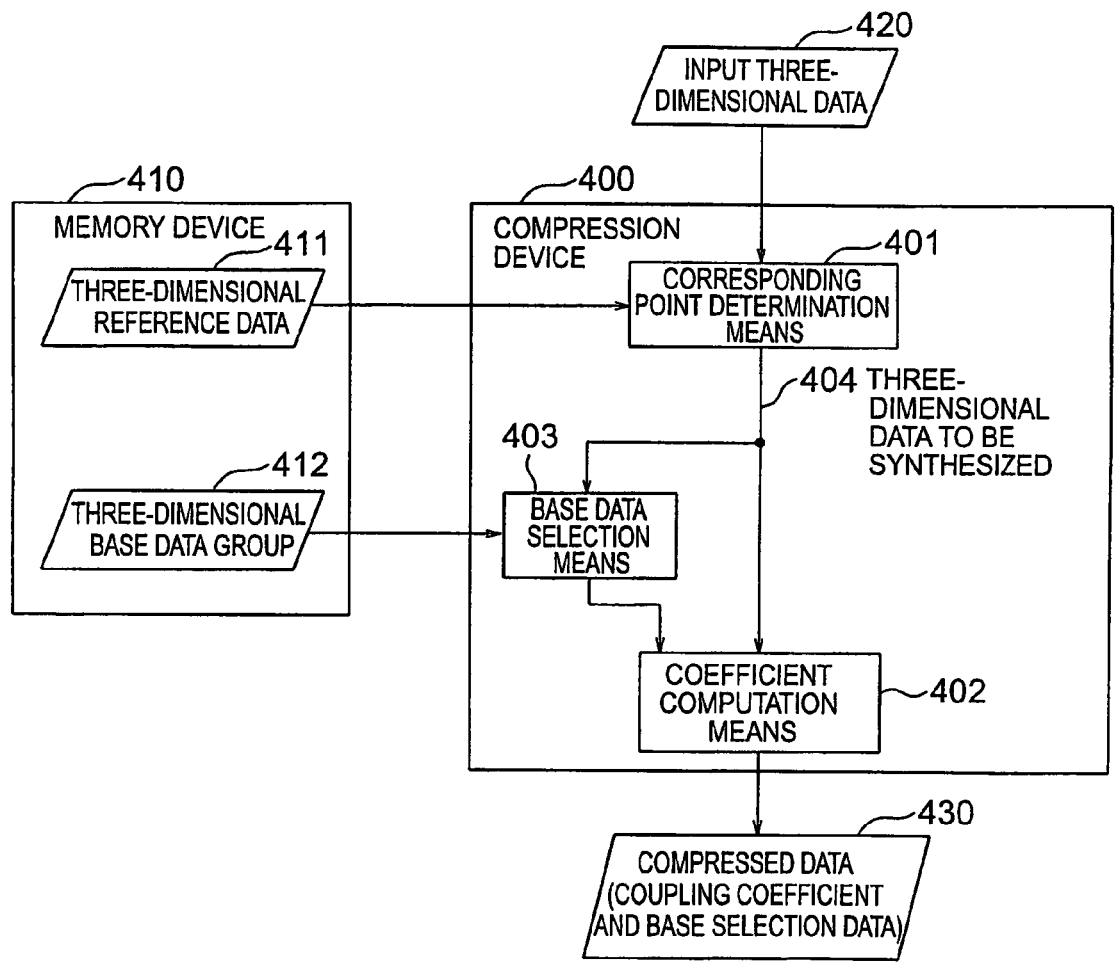
FIG. 7 is a block diagram showing a third embodiment of the data compression apparatus according to the present invention.

Referring to FIG. 7, a third embodiment of the data compression apparatus is different from the data compression apparatus according to the first embodiment shown in FIG. 1 in that a compression device 400 has base data selection means 403 in addition to corresponding point determination means 401 and coefficient computation means 402.

The base data selection means 403 selects from a three-dimensional base data group 412 a plurality of three-dimensional base data sets suitable for synthesis of three-dimensional data to be synthesized 404 generated by the corresponding point determination means 401, and transfers the same to the coefficient computation means 402. The coefficient computation means 402 computes coupling coefficients for coupling the plurality of three-dimensional base data sets selected by the base data selection means 403 to synthesize the three-dimensional data to be synthesized 404, and outputs the computed coupling coefficients and base selection data for identifying the plurality of three-dimensional base data sets used in the synthesis, as compressed data 430.

Input three-dimensional data 420, three-dimensional reference data 411, and three-dimensional base data group 412 are the same as the input three-dimensional data 120, the three-dimensional reference data 111 and the three-dimensional base data group 112 of FIG. 1. The corresponding point determination means 401 and the coefficient computation means 402 are substantially the same in terms of functions as the corresponding point determination means 101 and the coefficient computation means 102 of FIG. 1.

Figure 8:
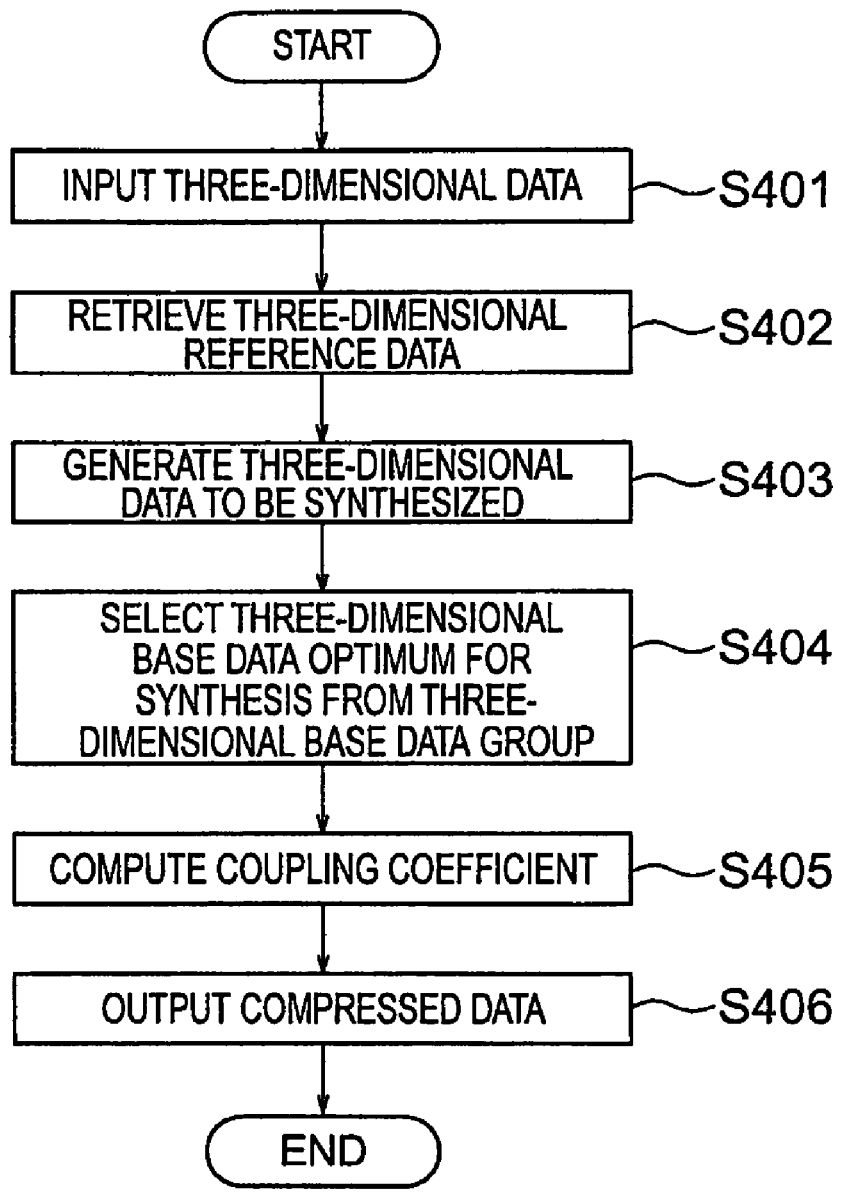
FIG. 8 is a flowchart showing an example of processing by the third embodiment of the data compression apparatus according to the present invention.

FIG. 8 shows a flow of processing carried out by the data compression apparatus according to this embodiment. Firstly, the corresponding point determination means 401 of the compression device 400 shown in FIG. 7 receives three-dimensional data 420 and reads three-dimensional reference data 411 from the memory device 41 to generate three-dimensional data to be synthesized 404 in which vertexes of the three-dimensional data 420 are made to correspond to vertexes of the three-dimensional reference data 411 (steps S401 to S403). The steps so far are the same as those of the operation of the data compression apparatus according to the embodiment shown in FIG. 1.

The base data selection means 403 then reads a three-dimensional base data group 412 from the memory device 410, and selects therefrom a plurality of three-dimensional base data sets suitable for synthesis of the three-dimensional data to be synthesized 404 (step S404). Specifically, a correlation value (similarity) Rk between each three-dimensional base data set (Sbk, Tbk) contained in the three-dimensional base data group 412 and the three-dimensional data to be synthesized (St, Tt) is computed according to the following equation using an appropriate weight wR.

$$Rk=(Sbk \cdot St)/(|Sbk||St|)+wR\{(Tbk \cdot Tt)/(|Tbk||Tt|)\} \quad (13)$$

In the equation (13) above, the symbol "·" represents an inner product of vectors.

The base data selection means 403 then selects a three-dimensional base data set having a large correlation value Rk. Various methods may be used as the selection method, including a method in which a predetermined number of three-dimensional base data sets are selected in descending order of the correlation value Rk, and a method in which all the three-dimensional base data sets are selected, having correlation values Rk greater than a predetermined threshold value. Description here will be made taking an example in which the top 50 three-dimensional base data sets are selected from the three-dimensional base data group 412 in descending order of the correlation value Rk. The selected 50 three-dimensional base data sets are indicated as first, second, . . . and 50th three-dimensional base data sets by assigning sequential numbers in ascending order, respectively, while the three-dimensional shapes and textures thereof are represented by vectors {Sbk, Tbk}. Further, base selection data is generated for indicating which data sets are selected from the three-dimensional base data group 412. When the three-dimensional base data group 412 has 100 three-dimensional base data sets, for example, it can be indicated with a 100-bit data set which three-dimensional base data sets are selected.

The methods of selecting the correlation value (similarity) and the three-dimensional base data sets described above are just example, and various other methods can be used. For example, a method can be employed in which correlation values are computed independently for the shape and the texture, and 50 data sets having great correlation values for the shape and the texture are selected as the three-dimensional base data sets. In this case, different three-dimensional base data sets may possibly be selected between the shape and the texture. Therefore, two base selection data sets are required to indicate which three-dimensional base data sets are selected from the three-dimensional base data group 412 for the shape and the texture, and data of 200 bits in total is required.

Subsequently, the coefficient computation means 402 computes coupling coefficients {$\alpha s1, \ldots \alpha s50, \alpha t1, \ldots, \alpha t50$} for synthesizing the three-dimensional data to be synthesized 404 according to the equations (8) and (9), using the three-dimensional base data group selected by the base data selection means 403 (step S405).

The coefficient computation means 402 then outputs the computed coefficient data and the base selection data consisting of a list identifying the three-dimensional base data group used in the synthesis, as compressed data 430 (step S406).

Effects of the data compression apparatus according to the second embodiment will be described.

The data compression apparatus of the second embodiment is designed such that data compression is performed on the input three-dimensional data 420 by selecting optimum three-dimensional base data sets, and therefore is capable of reducing the number of used three-dimensional base data sets. In the example used for the description above, in particular, the number of three-dimensional base data sets is reduced to 50 by the base data selection means 403, whereby the coefficient data amount can be reduced to a half compared with a case in which 100 three-dimensional base data sets are used. In addition, a reduction of the coefficient computation amount also enables high-speed processing. In the example used for the description above, the number of coupling coefficients computed according to the equations (8) and (9) is reduced to a half, and hence the computation time is shortened to about a half. Furthermore, even when the number of used three-dimensional base data sets remains the same, the accuracy of restored three-dimensional data can be improved. Specifically, the error between the three-dimensional data restored according to the equations (10) and (11) and the input three-dimensional data 420 can be reduced by preparing 100 three-dimensional base data sets and selectively using 50 sets according to this embodiment, in comparison with a case in which 50 three-dimensional base data sets are preliminarily prepared and these 50 three-dimensional base data sets are always used.

Second Embodiment Data of Restoration Apparatus

An example of configuration of a data restoration apparatus for restoring original three-dimensional data from compressed data generated by the data compression apparatus of the second embodiment shown in FIG. 5 and the data compression apparatus of the third embodiment shown in FIG. 7.

Figure 9:
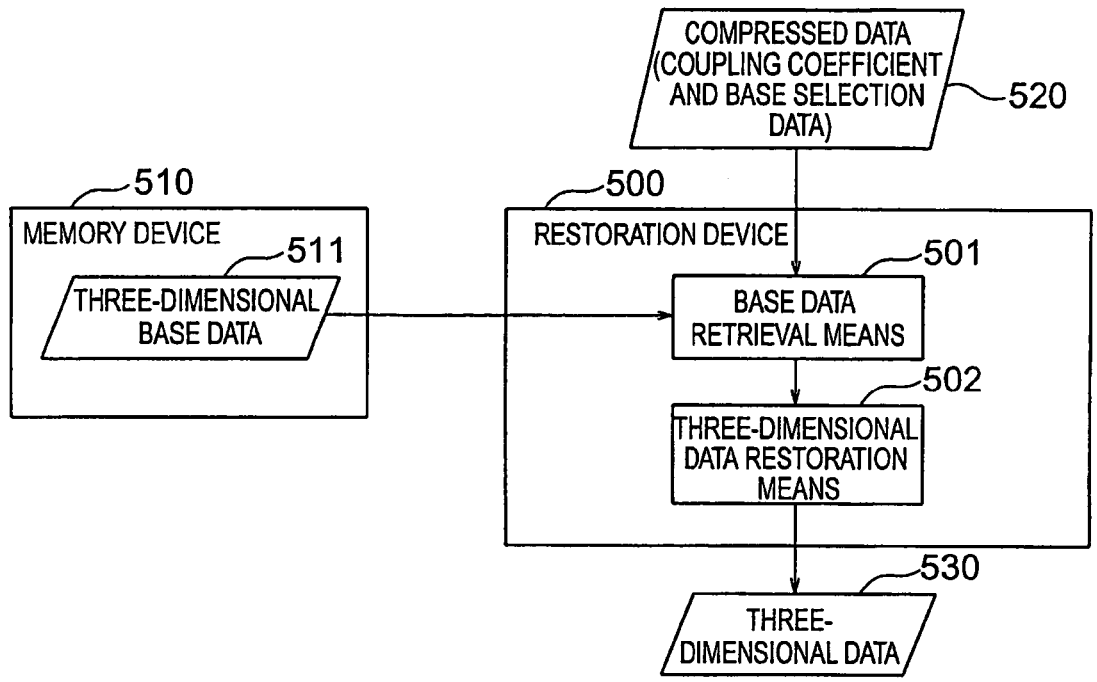
FIG. 9 is a block diagram showing a second embodiment of the data restoration apparatus according to the present invention.

Referring to FIG. 9, a second embodiment of the data restoration apparatus is composed of a restoration device 500 which receives compressed data 520 of three-dimensional data representing a shape of an object and outputs original three-dimensional data 530, and a memory device 510 connected thereto.

The illustrated memory device 510 preliminarily stores a three-dimensional base data group 511 that is identical with the three-dimensional base data group 312 in the data compression apparatus of FIG. 5 or the three-dimensional base data group 412 in the data compression apparatus of FIG. 7.

The restoration device 500 has base data retrieval means 501 which receives compressed data 520 corresponding to the compressed data 330 in the data compression apparatus of FIG. 5 or the compressed data 430 of FIG. 7, and retrieves from the memory device 510 a three-dimensional base data group used for syntheses by the compression side based on base selection data contained in the compressed data 520, and three-dimensional data restoration means 502 which outputs three-dimensional data 530 obtained by coupling the three-dimensional base data group thus retrieved with the use of the coupling coefficients contained in the compressed data 520.

Figure 10:
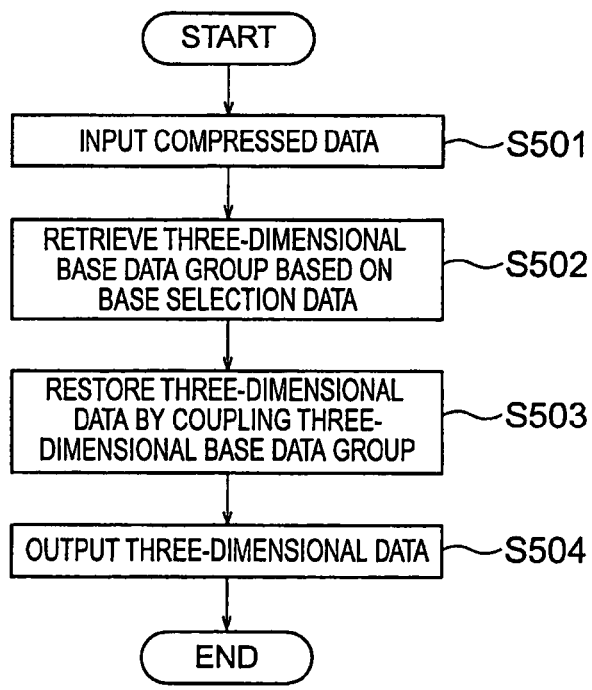
FIG. 10 is a flowchart showing an example of processing by the second embodiment of the data restoration apparatus according to the present invention.

FIG. 10 shows a flow of processing carried out by the data restoration apparatus according to the third embodiment. When the base data retrieval means 501 of the restoration device 500 shown in FIG. 9 receives the compressed data 520 (step S501), the base data retrieval means 501 retrieves a three-dimensional base data group used for synthesis by the compression apparatus from the three-dimensional base data group 511 in the memory device 510, based on the base selection data contained in the compressed data 520 (step S502).

Subsequently, the three-dimensional data restoration means 502 couples the three-dimensional base data group retrieved by the base data retrieval means 501 according to the equations (10) and (11) above using the coupling coefficient contained in the compressed data 520 to restore the three-dimensional data and outputs the restored data (steps S503 and S504).

Fourth Embodiment of Data Compression Apparatus

Figure 11:
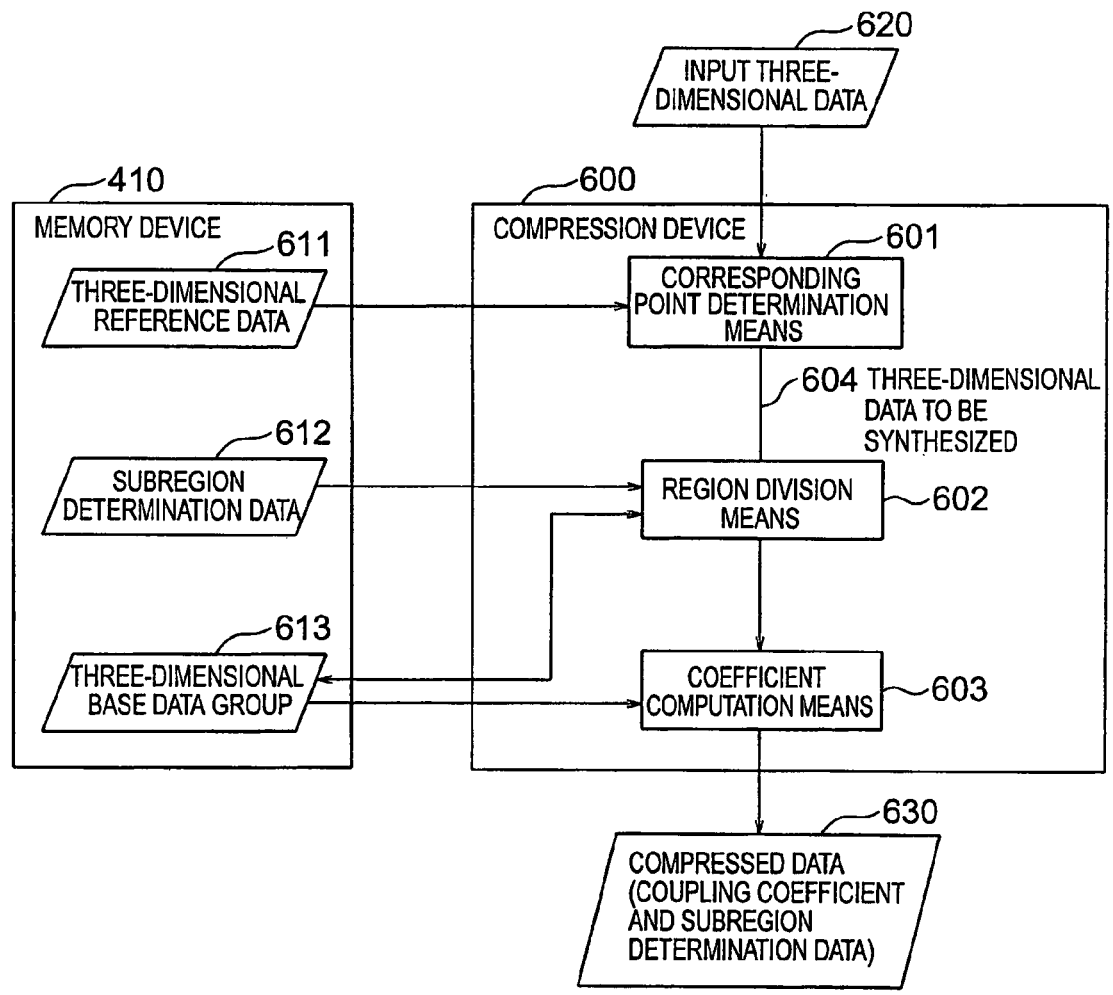
FIG. 11 is a block diagram showing a fourth embodiment of the data compression apparatus according to the present invention.

Referring to FIG. 11, a fourth embodiment of the data compression apparatus is different from the data compression apparatus according to the first embodiment shown in FIG. 1 in that a compression device 600 has region dividing means 602 in addition to corresponding point determination means 601 and coefficient computation means 603, and a memory device 610 has subregion determination data 612 in addition to three-dimensional reference data 611 and a three-dimensional base data group 613.

The subregion determination data 612 defines how a three-dimensional data to be synthesized 604 generated by the corresponding point determination means 601 based on input three-dimensional data 620 and the three-dimensional base data group 613 to be used for synthesis are divided into subregions. More specifically, the subregion determination data 612 is formed by a table describing which subregion each of the vertexes of the three-dimensional data to be synthesized represented by the equations (4) and (5) above and each of the vertexes of the three-dimensional base data set represented by the equations (6) and (7) above belongs to. It can be arbitrarily determined how many subregions it is divided into, and how large the subregions are.

The region dividing means 602 divides the three-dimensional data to be synthesized 604 and each three-dimensional base data set in the three-dimensional base data group 613 into identical subregions with reference to the subregion determination data 612, and outputs the subregions of the three-dimensional data to be synthesized 604 to the coefficient computation means 603, while the subregions of the three-dimensional base data group 613 are stored in the memory device 610. If the three-dimensional base data group 613 has already been divided into subregions based on the subregion determination data 612, the division processing thereof can be omitted.

The coefficient computation means 603 computes, for each subregion, coupling coefficients for coupling the three-dimensional base data group 613 divided into the same subregion to synthesize the three-dimensional data to be synthesized 604, and outputs the coupling coefficient thus computed for each subregion as compressed data 630 of the three-dimensional data 620. The compressed data 630 may contain the subregion determination data 612.

Figure 12:
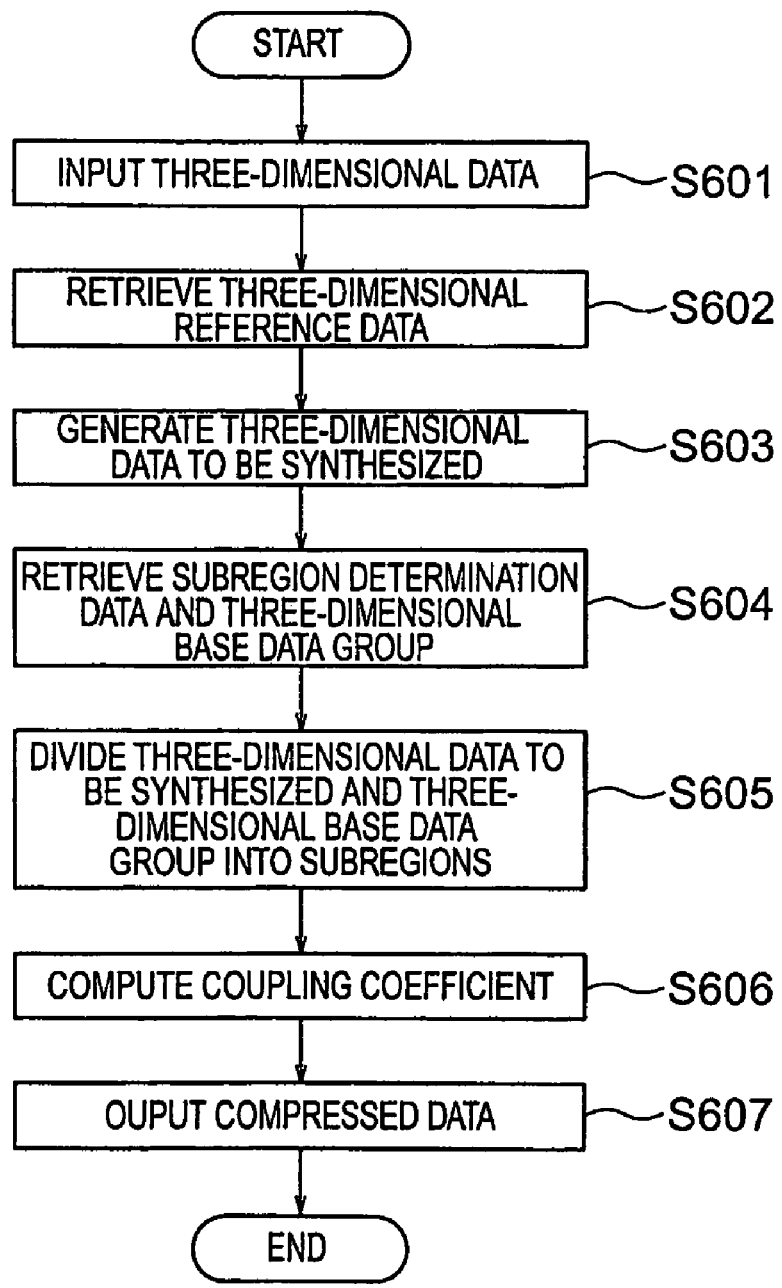
FIG. 12 is a flowchart showing an example of processing by the fourth embodiment of the data compression apparatus according to the present invention.

FIG. 12 shows a flow of processing carried out by the data compression apparatus of this embodiment. First, the corresponding point determination means 601 of the compression device 600 shown in FIG. 11 receives three-dimensional data 620, and retrieves three-dimensional reference data 611 from the memory device 610 to generate a three-dimensional data to be synthesized 604 in which vertexes of the three-dimensional data 620 are made to correspond to vertexes of the three-dimensional reference data 611 (steps S601 to S603). The processing steps so far are the same as the operation of the data compression apparatus according to the first embodiment shown in FIG. 1.

The region dividing means 602 then retrieves subregion determination data 612 and a three-dimensional base data group 613 from the memory device 610 (step S604), and divides the three-dimensional data to be synthesized 604 and the three-dimensional base data group 613 into a plurality of subregions according to the subregion determination data 612 (step S605). When subsregions of the three-dimensional data to be synthesized 604 are indicated by p (p=1, ..., m, where m denotes a total number of subregions), a p-th subregion is defined by a vector Stp, Ttp in which data of the vertex belonging to the p-th subregion is obtained from the equations (4) and (5) and arranged, the p-th subregion of the k-th three-dimensional base data set is defined by a vector Sbkp, Tbkp in which data of the vertex belonging to the p-th subregion are obtained from the equations (6) and (7) and arranged.

The coefficient computation means 603 then computes, for each subregion, a coupling coefficient $\{\alpha skp\}$, $\{\alpha tkp\}$ for synthesizing the subregions of the three-dimensional data to be synthesized 604, using the subregions of the three-dimensional base data group 613 according to equations equivalent to the equations (8) and (9) above (step S606).

The coefficient computation means 603 then outputs the coupling coefficient and the subregion determination data 612 for each subregion as compressed data 630 (step S607).

Effects of the data compression apparatus according to the fourth embodiment will be described.

In the data compression apparatus according to the fourth embodiment, the three-dimensional data to be synthesized 604 derived from the input three-dimensional data 620 and the three-dimensional base data group 613 are divided into the same plural number of subregions, and a coupling coefficient is found for each subrigion for coupling the three-dimensional base data group to synthesize the three-dimensional data to be synthesized. Therefore, compressed data can be obtained with higher restoration accuracy in comparison with a case in which no division of regions is conducted. This is because optimum coupling coefficients can be computed for each subregion by using the equations (8) and (9).

Fifth Embodiment of Data Compression Apparatus

Figure 13:
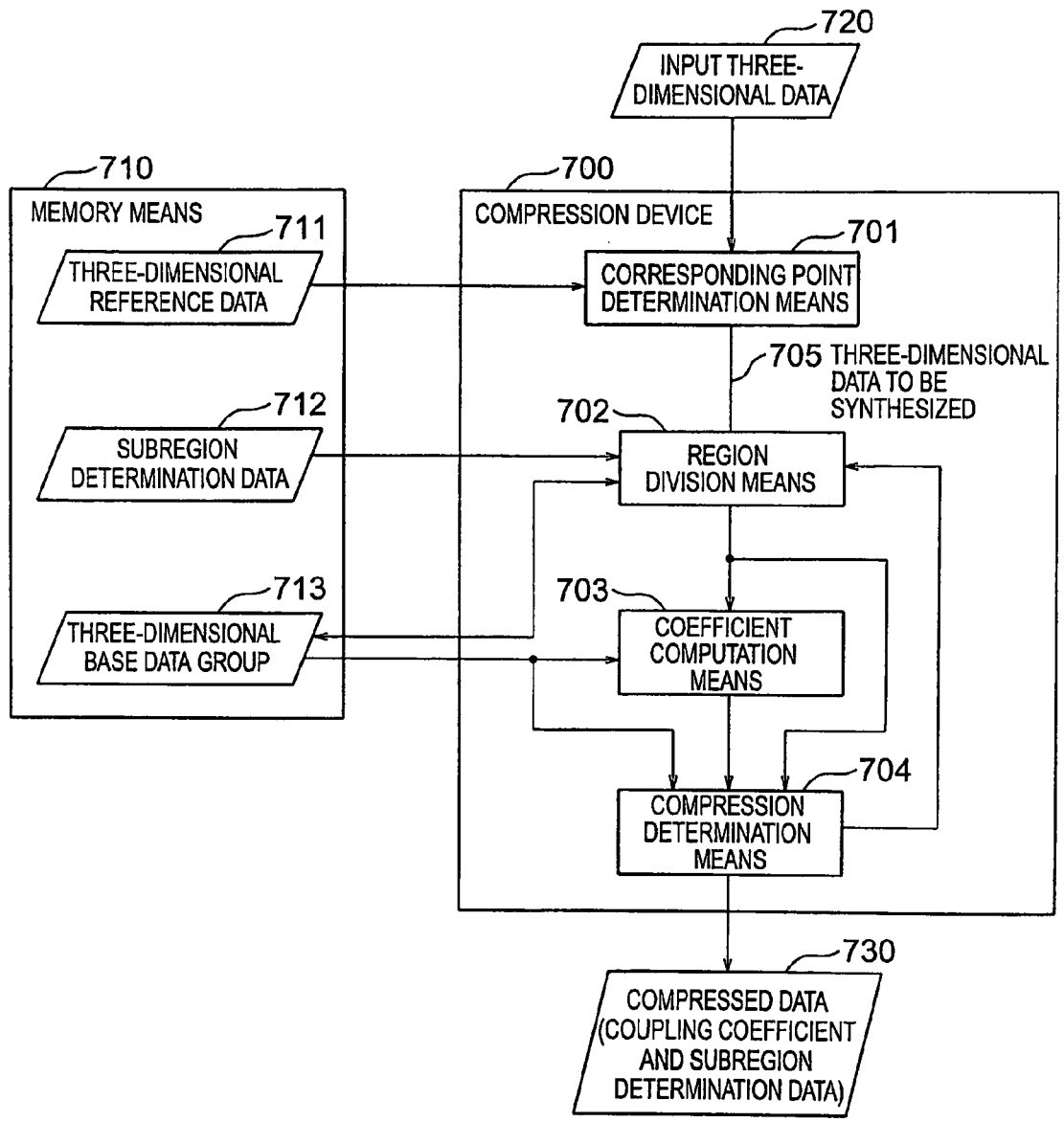
FIG. 13 is a block diagram showing a fifth embodiment of the data compression apparatus according to the present invention.

Referring to FIG. 13, a fifth embodiment of the data compression apparatus is different from the data compression apparatus according to the fourth embodiment shown in FIG. 11 in that a compression device 700 has compression determination means 704 in addition to corresponding point determination means 701, region dividing means 702, and coefficient computation means 703.

The compression determination means 704 restores three-dimensional data from a coupling coefficient computed for each subregion by the coefficient computation means 703 and each subregion of a three-dimensional base data group 713, and compares the restored three-dimensional data with a three-dimensional data to be synthesized 705. If the restoration accuracy does not satisfy a predetermined accuracy, the compression determination means 704 performs control such that the three-dimensional data to be synthesized 705 is further divided into smaller subregions and coupling coefficients are found for each subregion.

The input three-dimensional data 720, the three-dimensional reference data 711, and the three-dimensional base data group 713 are the same as the input three-dimensional data 620, the three-dimensional reference data 611, and the three-dimensional base data group 613 shown in FIG. 11. The corresponding point determination means 701, the region dividing means 702, and the coefficient computation means 703 are the same in terms of functions as the corresponding point determination means 601, the region dividing means 602, and the coefficient computation means 603 shown in FIG. 11.

The subregion determination data 712 contains a plurality of division definitions describing how the three-dimensional data to be synthesized 705 generated by the corresponding point determination means 701 from the input three-dimensional data 720 and the three-dimensional base data group 713 used for synthesis are divided into subregions. More specifically, each of the division definitions has a table describing to which subregion belongs each vertex of the three-dimensional data to be synthesized represented by the equations (4) and (5) above, and the three-dimensional base data represented by the equations (6) and (7) above. In each of the division definitions, it can be arbitrarily determined how many subregions the data is divided into, and how large the subregions are. When a division definition indicates that the number of divisions is one, it means that substantially no division is performed.

Figure 14:
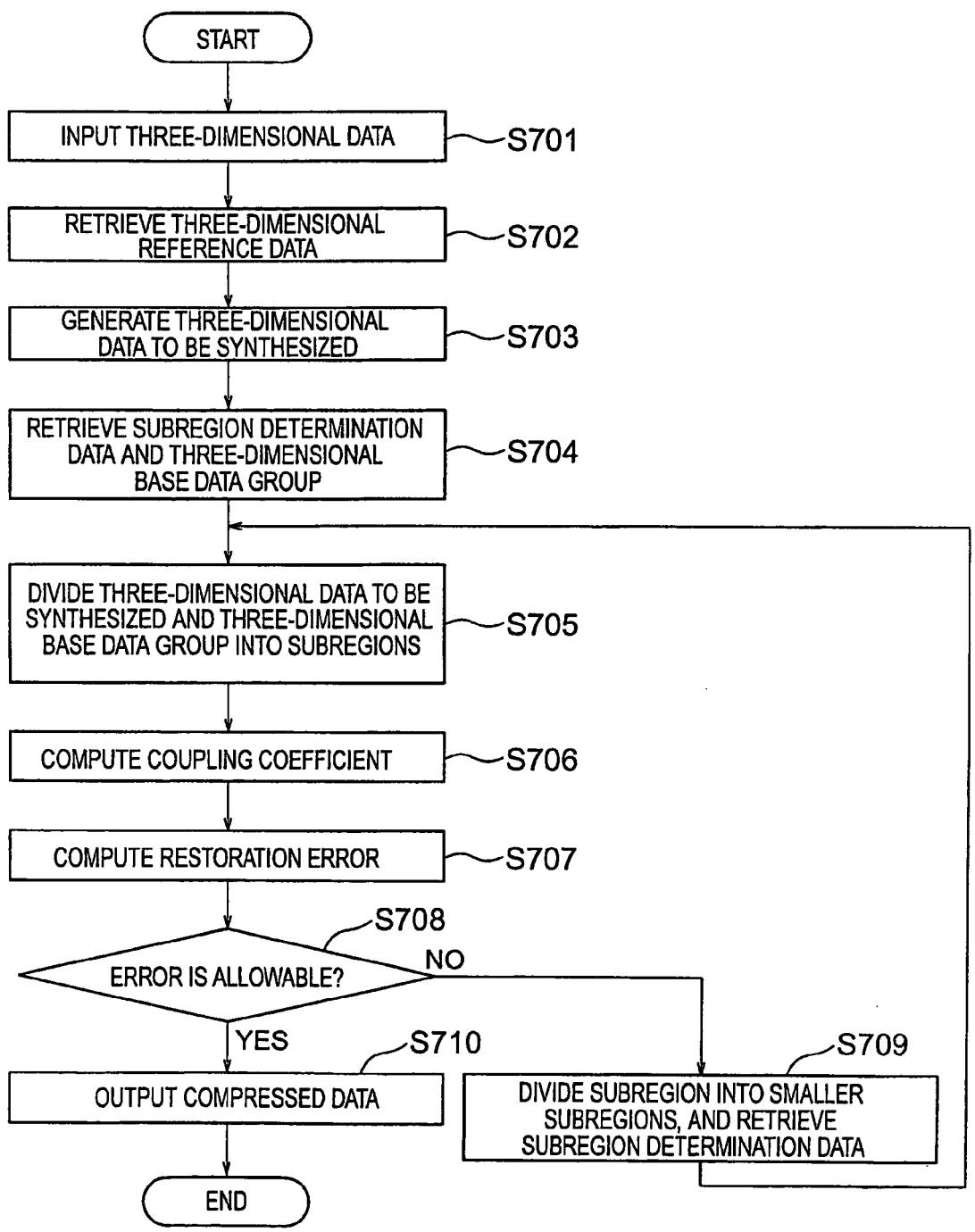
FIG. 14 is a flowchart showing an example of processing by the fifth embodiment of the data compression apparatus according to the present invention.

FIG. 14 shows a flow of processing carried out by the data compression apparatus of this embodiment. First, the corresponding point determination means 701 of the compression device 700 receives three-dimensional data 720 and retrieves three-dimensional reference data 711 from the memory device 710 to generate three-dimensional data to be synthesized 705 in which vertexes of the input three-dimensional data 720 are made to correspond to vertexes of the three-dimensional reference data 711 (steps S701 to S703).

Subsequently, the region dividing means 702 retrieves from the memory device 710 the subregion determination data 712 and the three-dimensional base data group 713 to be used in the first place (step S704), and divides the three-dimensional data to be synthesized 705 and the three-dimensional base data group 713 into a plurality of subregions according to the subregion determination data 712 thus retrieved (step S705). A p-th (p=1, ..., m, where m denotes a total number of subregions) subregion three-dimensional data to be synthesized 705 is defined by a vector Stp, Ttp in which data of vertexes belonging to the p-th subregion are obtained from the equations (4) and (5) above and arranged. A p-th subregion of a k-th three-dimensional base data set is defined by a vector Sbkp, Tbkp in which data of vertexes belonging to the p-th subregion are obtained from the equations (6) and (7) above and arranged.

Subsequently, the coefficient computation means 703 computes, for each subregion, a coupling coefficient $\{\alpha skp\}$, $\{\alpha tkp\}$ for synthesizing the subregions of the three-dimensional data to be synthesized 705 by using the subregions of the three-dimensional base data group 713 according to similar equations to the equations (8) and (9) above (step S706).

The compression determination means 704 then restores the subregions of the three-dimensional data by using the coupling coefficient $\{\alpha skp\}$, $\{\alpha tkp\}$ computed by the coefficient computation means 703 for each subregion and the vector Sbkp, Tbkp of the subregion of the three-dimensional base data group used in the synthesis, according to similar equations to the equations (10) and (11) above, and computes an error between the three-dimensional data set (Stp' and Ttp') of each of the restored subregions and the three-dimensional data set (Stp and Ttp) of each of the subregions of the three-dimensional data to be synthesized (step S707). While various criteria are envisageable for determining an error, one example is given by a value E which is obtained by the following equation as a weighted sum of squares of an error in distance of three-dimensional coordinates and brightness between corresponding vertexes.

$$E=(|Stp-Stp'|^2+we|Ttp-Ttp'|^2)/M \quad (12')$$

In the equation above, M denotes a number of vertexes contained in a subregion. When there are two or more subregions, the sum total of the values obtained for each of the subregions computed using the equation (12') is defined as a final error.

While various values can be used as the weight coefficient we, a value of 1.0 is used here as an example. When the present invention is used for improving the texture reproducibility, a greater value should be used as the weight coefficient we.

In the next step, the compression determination means 704 determines whether or not the value of error E is smaller than a predetermined threshold value. If the error is too large (NO in step S708), the control is returned to the region dividing means 705. The region dividing means 705 then retrieves from the memory device 710 subregion determination data 712 for further dividing a subregion into smaller subregions (step S709), and repeats the processing steps after the step S705. This makes it possible to obtain coupling coefficients for each smaller subregion, and it is determined whether a desired restoration accuracy is obtained or not in the same manner as the previous processing. The division into smaller subregions and recomputation of coupling coefficients are repeated until a satisfactory error is obtained or there is no more subregion determination data left to be divided further.

If the error E is not greater than the predetermined threshold value in step S708, in contrast, the compression determination means 704 outputs the coupling coefficients computed for each subregion by the coefficient computation means 302 and the subregion determination data 712, as compressed data 730 (step S710).

Figure 15:
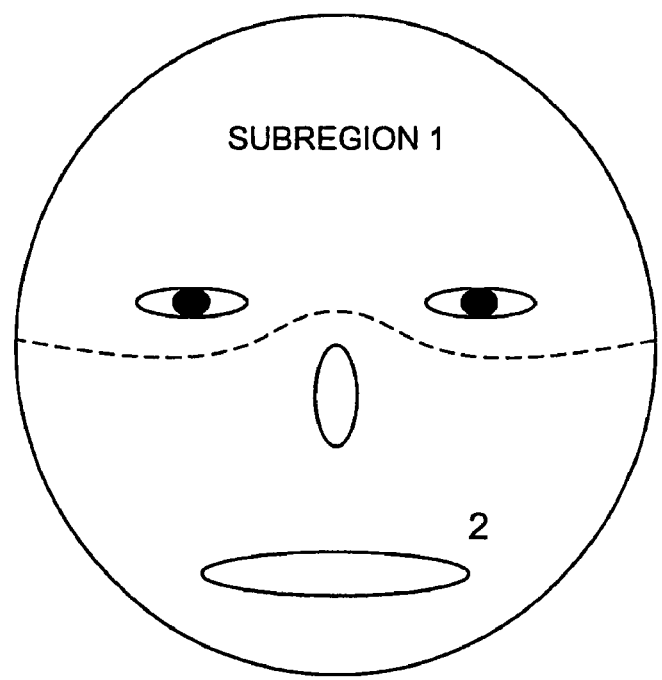
FIG. 15 is a diagram showing an example of a method of dividing three-dimensional facial data.
Figure 16:
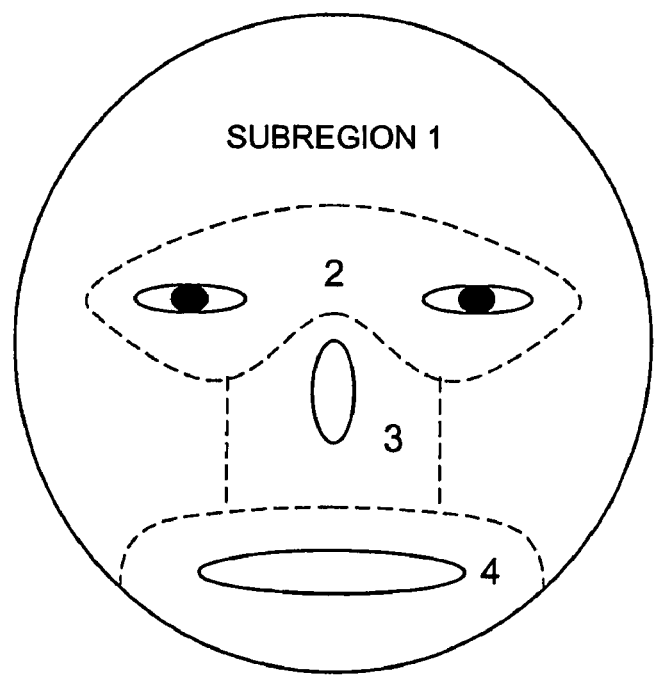
FIG. 16 is a diagram showing another example of the method of dividing three-dimensional facial data.
Figure 17:
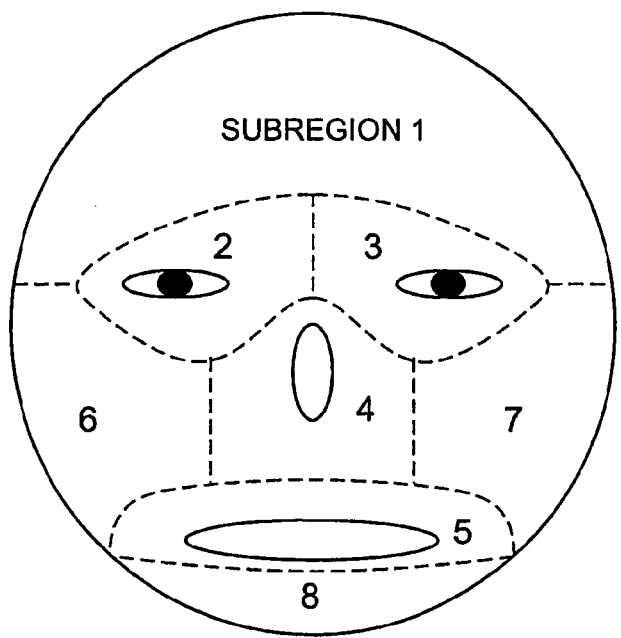
FIG. 17 is a diagram showing still another example of the method of dividing three-dimensional facial data.

The method of dividing data into subregions by the region dividing means 702 may be realized, for example, by preliminarily determining a multiple-step method of dividing into sequentially smaller and smaller subregions by means of the subregion determination data 712 as described above. This will be described taking an example of a human face. In a first step of the subregion dividing method, the human face as a whole is taken as one subregion (which means that no division is performed). In a second step of the subregion dividing method, the face is divided into two regions, upper and lower, as shown in FIG. 15. In a third step of the subregion dividing method, the face is divided into four regions as shown in FIG. 16. Further, in a fourth step of the subregion dividing method, the face is divided into eight regions as shown in FIG. 17. In this manner, the multiple-step subregion dividing method is predefined by means of the subregion determination data 712. A coupling coefficients are computed for the subregion obtained by the first step of the subregion dividing method and an error E is computed. If the value of the error E is greater than a predetermined threshold value, then the second step of the subregion dividing method is applied so that a coupling coefficient is computed for the subregions obtained by the second step of the subregion dividing method and an error E is computed. If the value of the error E is still greater than the predetermined threshold value, then the data is further subdivided into third-step subregions, fourth-step subregions, an onwards. In this manner, the processing is repeated until the value of E becomes equal to or smaller than the threshold value or the number of subregions reaches a predetermined maximum value.

Another dividing method may be employed in which a region having a large E value computed for each subregion is divided further and further until the value of E becomes smaller than a predetermined threshold value. For example, a state in which no division is performed is defined as an initial state, and compression, restoration, and computation of an error E are performed. If the value of E exceeds the threshold value, data is divided into regions which are larger and smaller than an average value based on the x coordinate of the vertex. It is only an example that the data is divided based on the x coordinate value, and various other methods can be employed. Compression, restoration, and computation of an error E are again performed for each of the two divided regions. A value of E is computed for each of the regions, and if a value of error E in any subregion exceeds the threshold value, the relevant region is further divided. For example, the region is further divided into two depending on whether or not the y coordinate is greater than an average value of the y coordinates of all the vertexes in that region, whereby three subregions in total are formed. The processing is terminated here for the region in which the value of error E does not exceed the threshold value, and compression, restoration, and computation of an error E are again performed for the newly divided two regions. If the value of E exceeds the threshold value, the relevant region is further divided by using a value of the x-coordinate or the z-coordinate. The processing is repeated until the value of error E becomes smaller than the threshold value in all the subregions, or until the number of divisions reaches a predetermined value. Any region having a large value of restoration error E is further divided into smaller subregions in this manner, whereby data compression can be performed efficiently and with less error.

Effects of the data compression apparatus of the third embodiment will be described.

In the data compression apparatus of the third embodiment, if the restoration accuracy does not satisfy a predetermined accuracy, the three-dimensional data to be synthesized is further divided into smaller subregions and computation is repeated to find coupling coefficients. Therefore, the restoration accuracy of a certain value or less can be ensured.

Third Embodiment of Data Restoration Apparatus

Description will be made of an example of configuration of a data restoration apparatus for restoring original three-dimensional data from compressed data generated by the data compression apparatus of the fourth embodiment shown in FIG. 11 or the data compression apparatus of the fifth embodiment shown in FIG. 13.

Figure 18:
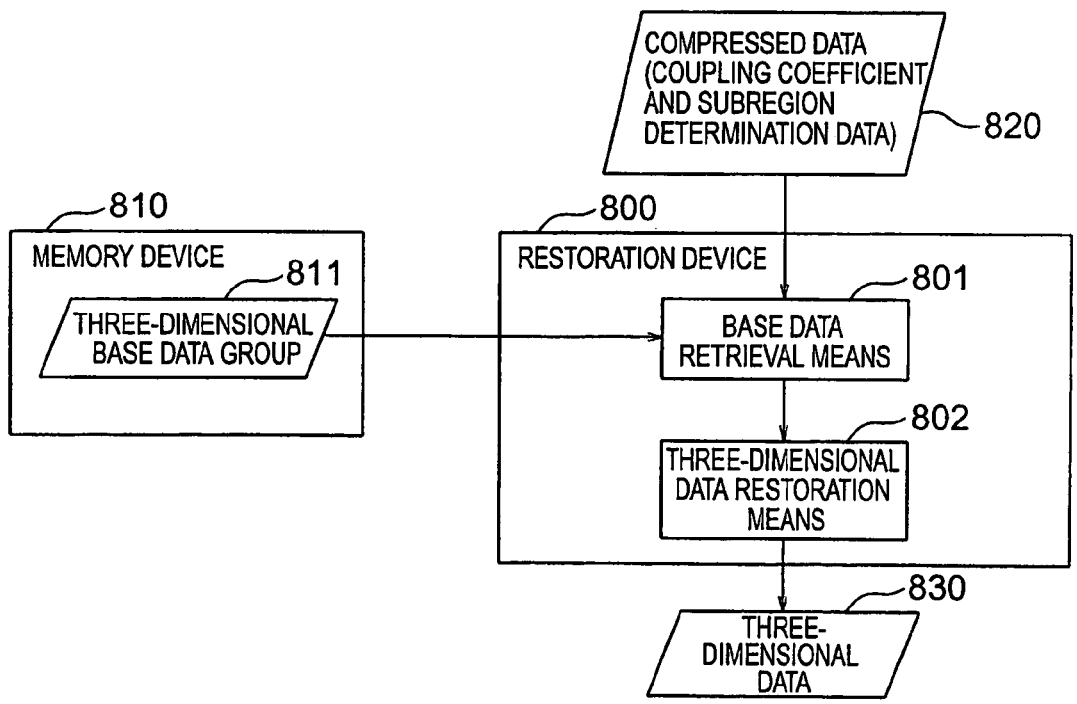
FIG. 18 is a block diagram showing a third embodiment of the data restoration apparatus according to the present invention.

Referring to FIG. 18, a third embodiment of the data restoration apparatus is composed of a restoration device 800 which receives compressed data 820 of three-dimensional data representing a shape of an object and outputs its original three-dimensional data 830, and a memory device 810 connected thereto.

The memory device 810 preliminarily stores a three-dimensional base data group 811 which is completely identical to the three-dimensional base data group 612 on the data compression side in FIG. 11 or the three-dimensional base data group 713 on the data compression side in FIG. 13.

The restoration device 800 has base data retrieval means 801 which receives compressed data 820 corresponding to the compressed data 630 on the data compression side in FIG. 11 or the compressed data 730 in FIG. 13, and extracts, from the three-dimensional base data group 811, subregions of the three-dimensional base data group used for synthesis on the compression side based on subregion determination data contained in the compressed data 820, and three-dimensional data restoration means 802 which restores three-dimensional data 830 by coupling similar subregions of the three-dimensional base data group thus extracted by using a coupling coefficient for each subregion contained in the compressed data 820.

Figure 19:
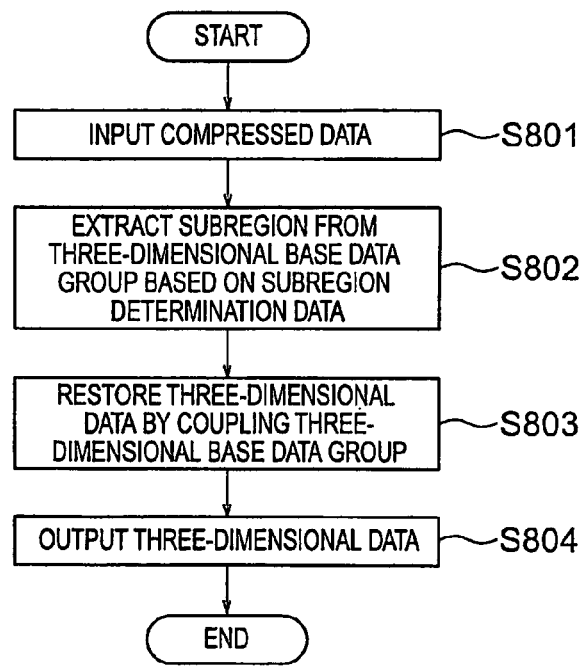
FIG. 19 is a flowchart showing an example of processing by the third embodiment of the data restoration apparatus according to the present invention.

FIG. 19 shows a flow of processing carried out by the data restoration apparatus of this embodiment. When the base data retrieval means 801 of the restoration device 800 receives compressed data 820 (step S801), the base data retrieval means 801 divides each of the three-dimensional base data sets of the three-dimensional base data group 811 into a plurality of subregions according to subregion determination data contained in the compressed data 820, and outputs the divided data to the three-dimensional data restoration means 802 together with a coupling coefficient for each of the subregions contained in the compressed data 820 (step S802). If the three-dimensional base data group divided according to the subregion determination data has already been stored in the memory device 810, it will suffice that the divided data is retrieved from the memory device 810.

Subsequently, the three-dimensional data restoration means 802 restores the three-dimensional data by coupling the three-dimensional base data group extracted by the base data retrieval means 801 and belonging to each same subregion with the use of the coupling coefficients for each subregion, and outputs the restored three-dimensional data (step S803, S804). Smoothing processing may be performed at boundaries between the coupled subregions.

Exemplary Embodiment of Compression/Restoration System

Figure 20:
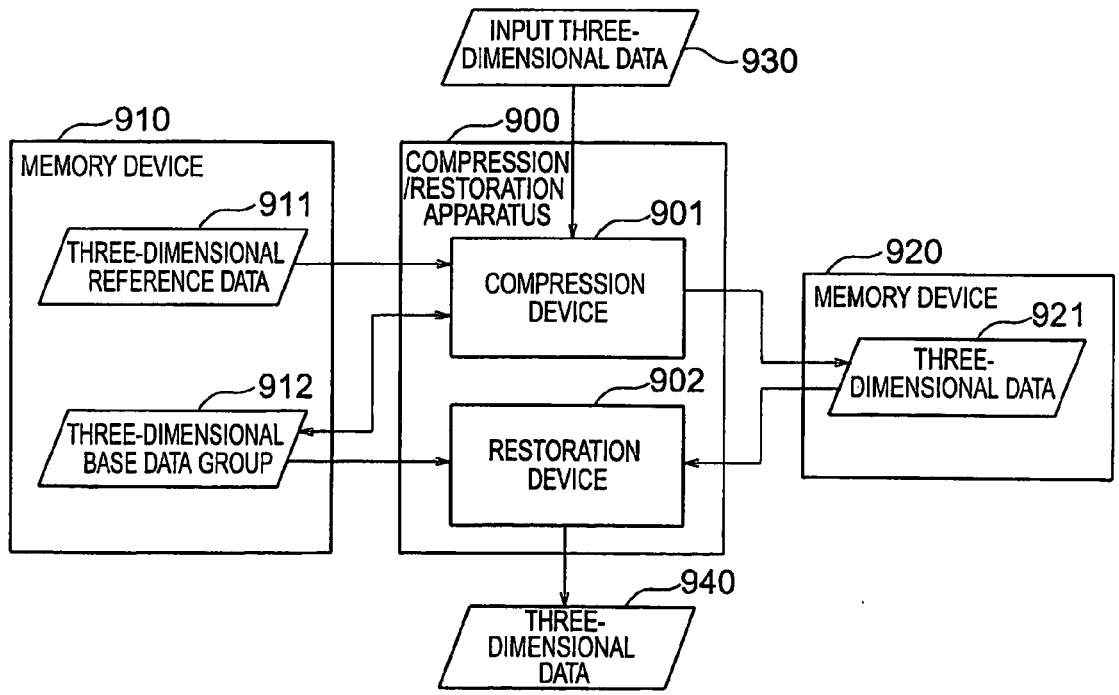
FIG. 20 is a block diagram showing an embodiment of a compression/restoration system according to the present invention.

Referring to FIG. 20, an example of compression/restoration system according to the present invention is composed of a compression/restoration apparatus 900 and memory devices 910 and 920 connected thereto.

The compression/restoration apparatus 900 has a compression device 901 and a restoration device 902. The memory device 910 stores three-dimensional reference data 911 and a three-dimensional base data group 912, while the memory device 920 stores compressed data 921.

The compression device 901 receives three-dimensional data 930 representing a shape of an object, and performs compression processing on the three-dimensional data 930 by using the three-dimensional reference data 911 and the three-dimensional base data group 912 stored in the memory device 910, and stores the resulting compressed data 921 in the memory device 920.

The restoration device 902 retrieves compressed data 921 from the memory device 920, performs restoration processing on the compressed data 921 by using the three-dimensional base data group 912 stored in the memory device 910, and outputs the resulting three-dimensional data 940.

The compression device 901 may be the compression device 100 shown in FIG. 1. In this case, the input three-dimensional data 930 corresponds to the input three-dimensional data 120, the three-dimensional reference data 911 corresponds to the three-dimensional reference data 111, the three-dimensional base data group 912 corresponds to the three-dimensional base data group 112, and the compressed data 921 corresponds to the compressed data 130. The restoration device 902 in this case may be the restoration device 200 shown in FIG. 3. Operation of the compression/restoration system of this embodiment having the configuration above is the same except that the output destination in step S106 of FIG. 2 is changed to the memory device 920, and the source of data in step S201 of FIG. 4 is changed to the memory device 920.

The compression device 901 may also be the compression device 300 shown in FIG. 5. In this case, the input three-dimensional data 930 corresponds to the input three-dimensional data 320, the three-dimensional reference data 911 corresponds to the three-dimensional reference data 311, the three-dimensional base data group 912 corresponds to the three-dimensional base data group 312, and the compressed data 921 corresponds to the compressed data 330. The restoration device 902 in this case may be the restoration device 500 shown in FIG. 9. Operation of the compression/restoration system of this embodiment having the configuration above is the same except that the output destination in step S309 of FIG. 6 is changed to the memory device 920 and the source of data in step S501 of FIG. 10 is changed to the memory device 920.

The compression device 901 may also be the compression device 400 shown in FIG. 7. In this case, the input three-dimensional data 930 corresponds to the input three-dimensional data 420, the three-dimensional reference data 911 corresponds to the three-dimensional reference data 411, the three-dimensional base data group 912 corresponds to the three-dimensional base data group 412, and the compressed data 921 corresponds to the compressed data 430. The restoration device 902 in this case may be the restoration device 500 shown in FIG. 9. Operation of the compression/restoration system of this embodiment having the configuration above is the same except that the output destination in step S406 of FIG. 8 is changed to the memory device 920, and the source of data in step S501 of FIG. 10 is changed to the memory device 920

The compression device 901 may be the compression device 600 shown in FIG. 11. In this case, the input three-dimensional data 930 corresponds to the input three-dimensional data 620, the three-dimensional reference data 911 corresponds to the three-dimensional reference data 611, the three-dimensional base data group 912 corresponds to the three-dimensional base data group 613, and the compressed data 921 corresponds to the compressed data 630. Same data as the subregion determination data 612 is stored in the memory device 910. The restoration device 902 in this case may be the restoration device 800 shown in FIG. 18. Operation of the compression/restoration system of this embodiment having the configuration above is the same except that the output destination in step S607 of FIG. 12 is changed to the memory device 920, and the source of data in step S801 of FIG. 9 is changed to the memory device 920.

The compression device 901 may also be the compression device 700 shown in FIG. 13. In this case, the input three-dimensional data 930 corresponds to the input three-dimensional data 720, the three-dimensional reference data 911 corresponds to the three-dimensional reference data 711, the three-dimensional base data group 912 corresponds to the three-dimensional base data group 713, and the compressed data 921 corresponds to the compressed data 730, and same data as the subregion determination data 712 is stored in the memory device 910. The restoration device 902 in this case may be the restoration device 800 shown in FIG. 18. Operation of the compression/restoration system of this embodiment having the configuration above is the same except that the output destination in step S710 of FIG. 14 is changed to the memory device 920 and the source of data in step S801 of FIG. 9 is changed to the memory device 920.

The memory device 920 storing the compressed data 921 can be realized by an arbitrary memory device. For example, a memory device which is portable and detachable from the compression/restoration apparatus 900 may be used.

Effects of the compression/restoration system of this embodiment will be described.

According to this exemplary embodiment, stored is the compressed data 921 containing a coupling coefficient for restoring three-dimensional data by using the three-dimensional base data group 912, instead of the input three-dimensional data 930. Since the data amount of the compressed data 921 is much smaller than that of the three-dimensional data 930, the memory capacity required for storage of the three-dimensional data can be reduced remarkably.

Additionally, according to this exemplary embodiment, whenever the stored three-dimensional data becomes necessary, the original three-dimensional data can be restored from the compressed data 921 with a high accuracy.

Further, the use of a portable memory device as the memory device 920 makes it possible to freely carry on the compressed data 921, and this enables a mode of usage in which the memory device 920 is mounted on another compression/restoration system having a similar configuration to restore the original three-dimensional data at another location. Since a high compression ratio is realized, a large amount of three-dimensional data can be stored in the small-sized memory device 920 with a small memory capacity. Further, the coupling coefficient is stored in the memory device 920 but no three-dimensional base data group is stored therein. Therefore, even if the memory device 920 is stolen, the three-dimensional data cannot be restored with the stolen memory device 920. This ensures confidentiality of data.

Exemplary Embodiment of Data Transmission System

Figure 21:
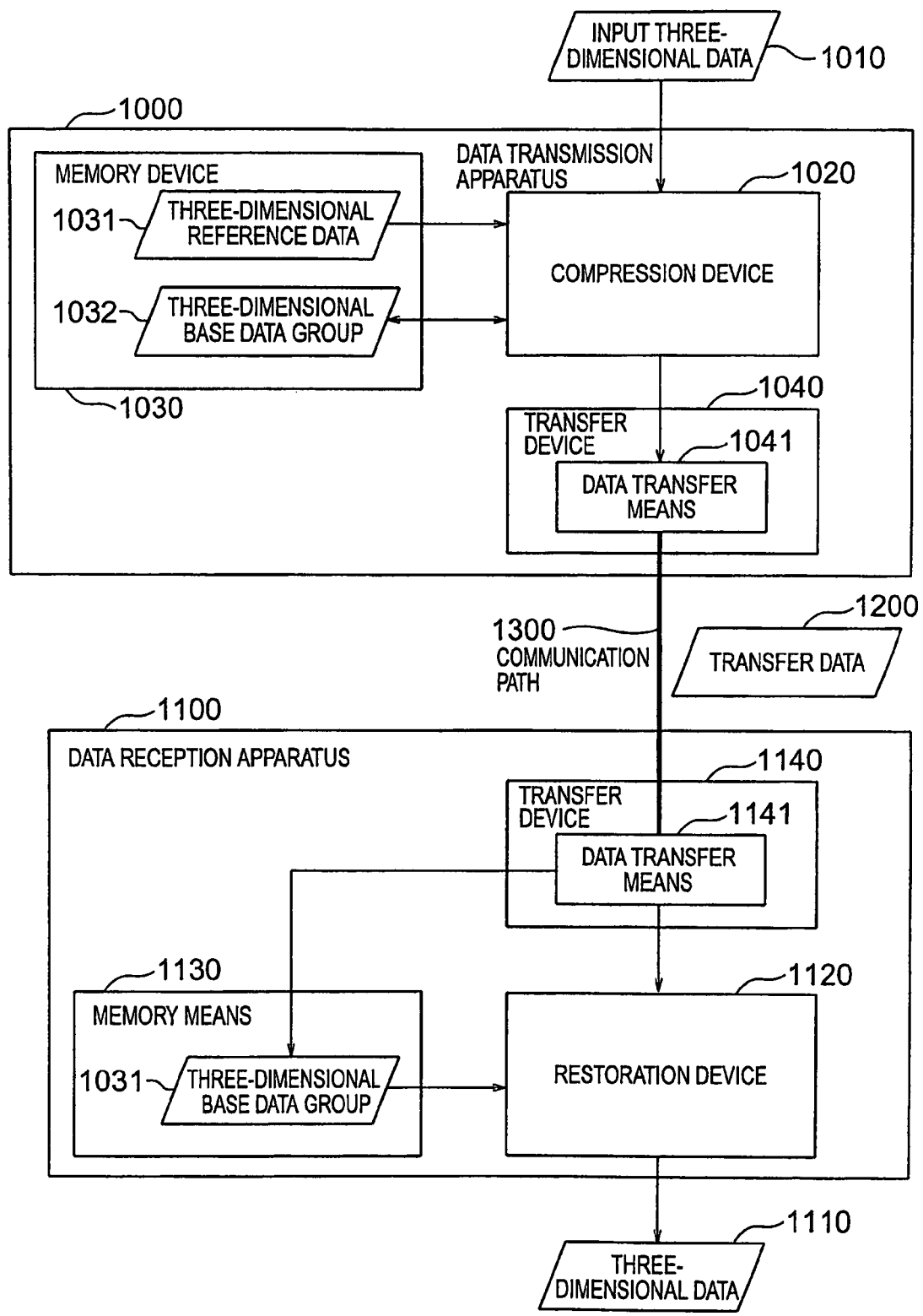
FIG. 21 is a block diagram showing an embodiment of a data transfer system according to the present invention.
Figure 22:
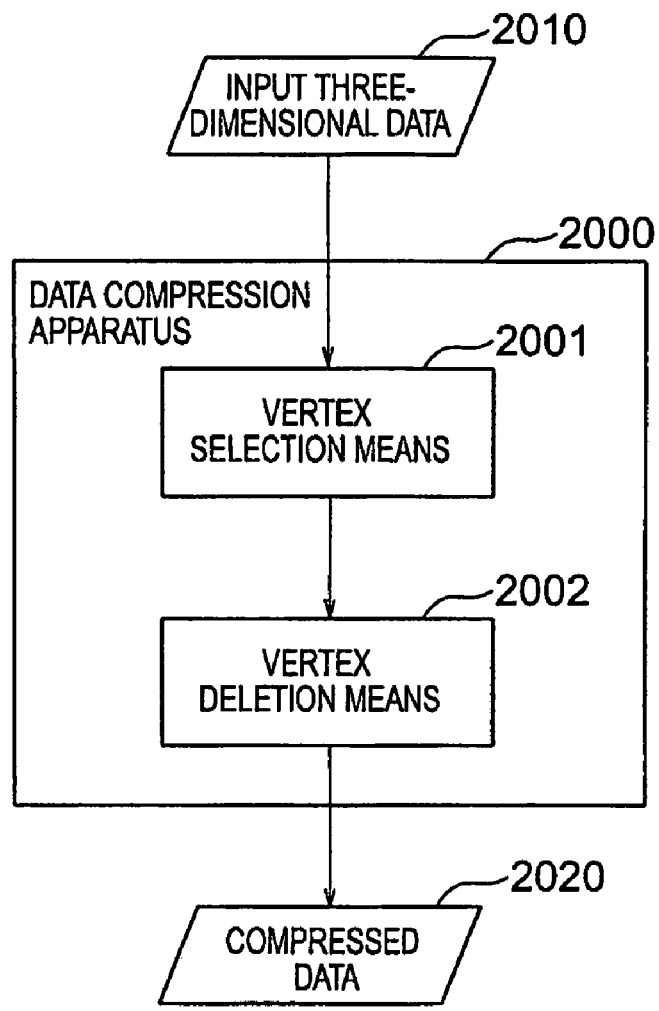
FIG. 22 is a block diagram showing a conventional data compression apparatus.

Referring to FIG. 21, an example of a data transmission system according to the present invention has a data transmission apparatus 1000 and a data reception apparatus 1100 connected to each other through a communication path 1300. The data transmission apparatus 1000 has functions of receiving three-dimensional data 1010 representing a shape of an object, and transmitting transfer data 1200 containing compressed data of the three-dimensional data 1010 to the data reception apparatus 1100 through the communication path 1300. The data reception apparatus 1100 has functions of receiving the transfer data 1200, restoring three-dimensional data 1110 from the compressed data contained in the transfer data 1200 and outputting the restored data.

The data transmission apparatus 1000 has a compression device 1020, a memory device 1030, and a transfer device 1040. The memory device 1030 stores three-dimensional reference data 1031 and a three-dimensional base data group 1032. The compression device 1020 receives the three-dimensional data 1010 and performs compression processing on the three-dimensional data 1010, using the three-dimensional reference data 1031 and the three-dimensional base data group 1032 stored in the memory device 1030, and outputs the resulting compressed data to data transfer means 1041. The transfer device 1040 has data transfer means 1041 transmitting the data output by the compression device 1020 to a designated communication partner.

The data reception apparatus 1100 has a restoration device 1120, a memory device 1130, and a transfer device 1140. The memory device 1130 stores a three-dimensional base data group 1131. The transfer device 1140 has data transfer means 1141 which receives the data 1200 transmitted through the communication path 1300, and outputs the same to the restoration device 1120. The restoration device 1120 performs restoration processing on compressed data contained in the transfer data 1200 received from the data transfer means 1141, using the three-dimensional base data group 1131 stored in the memory device 1130, and outputs the resulting three-dimensional data 1110.

The compression device 1020 of the data transmission apparatus 1000 may be the compression device 100 shown in FIG. 1. In this case, the input three-dimensional data 1010 corresponds to the input three-dimensional data 120, the three-dimensional reference data 1031 corresponds to the three-dimensional reference data 111, the three-dimensional base data group 1032 corresponds to the three-dimensional base data group 112, and the compressed data output to the data transfer means 1041 corresponds to the compressed data 130. The restoration device 1120 of the data reception apparatus 1100 in this case may be the restoration device 200 shown in FIG. 3. Operation of the data transmission system of this embodiment is the same except that the output destination in step S106 of FIG. 2 is changed to the data transfer means 1041, a processing step is added to transmit the transfer data 1200 from the data transfer means 1041 to the data transfer means 1141, and the source of data in step S201 of FIG. 4 is changed to the data transfer means 1141.

The compression device 1020 of the data transmission apparatus 1000 may be the compression device 300 shown in FIG. 5. In this case, the input three-dimensional data 1010 corresponds to the input three-dimensional data 320, the three-dimensional reference data 1031 corresponds to the three-dimensional reference data 311, the three-dimensional base data group 1032 corresponds to the three-dimensional base data group 312, and the compressed data output to the data transfer means 1041 corresponds to the compressed data 330. The restoration device 1120 of the data reception apparatus 1100 in this case may be the restoration device 500 shown in FIG. 9. Operation of the compression/restoration system of this embodiment having the configuration above is the same except that the output destination in step S309 of FIG. 6 is changed to the data transfer means 1041, a processing step is added to transmit the transfer data 1200 from the data transfer means 1041 to the data transfer means 1141, the source of data in step S501 of FIG. 10 is changed to the data transfer means 1141, and when the compression determination means 303 in the compression device 1020 adds new three-dimensional base data to the three-dimensional base data group 1032, the added three-dimensional base data is transmitted by the data transfer means 1041 to the data transfer means 1141 through the communication path 1300 so that the data transfer means 1141 adds it to the three-dimensional base data group 1131, whereby matching processing is performed between the three-dimensional base data groups 1032 and 1131 by the data transmission apparatus 1000 and the data reception apparatus 1100.

The compression device 1020 of the data transmission apparatus 1000 may also be the compression device 400 shown in FIG. 7. In this case, the input three-dimensional data 1010 corresponds to the input three-dimensional data 420, the three-dimensional reference data 1031 corresponds to the three-dimensional reference data 411, the three-dimensional base data group 1032 corresponds to the three-dimensional base data group 412, and the compressed data output to the data transfer means 1041 corresponds to the compressed data 430. The restoration device 1120 of the data reception apparatus 1100 in this case may be the restoration device 500 shown in FIG. 9. Operation of the compression/restoration system of this embodiment having the configuration above is the same except that the output destination in step S406 of FIG. 8 is changed to the data transfer means 1041, a processing step is interposed to transmit the transfer data 1200 from the data transfer means 1041 to the data transfer means 1141, and the source of data in step S501 of FIG. 10 is changed to the data transfer means 1141.

The compression device 1020 of the data transmission apparatus 1000 may also be the compression device 600 shown in FIG. 11. In this case, the input three-dimensional data 1010 corresponds to the input three-dimensional data 620, the three-dimensional reference data 1031 corresponds to the three-dimensional reference data 611, the three-dimensional base data group 1032 corresponds to the three-dimensional base data group 613, and the compressed data output to the data transfer means 1041 corresponds to the compressed data 630. The same data as the subregion determination data 612 is stored in the memory device 1030. The restoration device 1120 of the data reception apparatus 1100 in this case may be the restoration device 800 shown in FIG. 18. Operation of the compression/restoration system of this embodiment having the configuration above is the same except that the output destination in step S607 of FIG. 12 is changed to the data transmission means 104, a processing step is added to transmit the transfer data 1200 from the data transfer means 1041 to the data transfer means 1141, and the source of data in step S801 of FIG. 19 is changed to the data transfer means 1141.

Further, the compression device 1020 of the data transmission apparatus 1000 may also be the compression device 700 shown in FIG. 13. In this case, the input three-dimensional data 1010 corresponds to the input three-dimensional data 720, the three-dimensional reference data 1031 corresponds to the three-dimensional reference data 711, the three-dimensional base data group 1032 corresponds to the three-dimensional base data group 713, and the compressed data output to the data transfer means 1041 corresponds to the compressed data 730. The same data as the subregion determination data 712 is stored in the memory device 1030. The restoration device 1120 of the data reception apparatus 1100 in this case may be the restoration device 800 shown in FIG. 18. Operation of the compression/restoration system of this embodiment having the configuration above is the same except that the output destination in step S710 of FIG. 14 is changed to the data transfer means 1041, a processing step is added to transmit the transfer data 1200 from the data transfer means 1041 to the data transfer means 1141, and the source of data in step S801 of FIG. 19 is changed to the data transfer means 1141.

Effects of the compression/restoration system of this embodiment will be described.

According to this exemplary embodiment, compressed data containing a coupling coefficient having a much smaller data amount is transferred in place of the input three-dimensional data 1010. Therefore, the load on the transmission system including the communication path 1300 can be reduced considerably.

In addition, when transferring a large amount of three-dimensional data, only a necessary three-dimensional base data group is transmitted to the reception side, while the large amount of three-dimensional data is transferred as compressed data containing a coupling coefficient. Accordingly, the total amount of transferred data can be reduced. Description will be made of an example, in which 10,000 sets of three-dimensional data are to be transferred, and 100 sets out of them are used as the three-dimensional base data group. When the three-dimensional data has 90,000 vertexes, the amount of each three-dimensional data set is 800 KB, and the amount of one compressed data containing a coupling coefficient is one KB, eight GB of data must be tranferred if all the data is transferred as it is. According to this embodiment, in contrast, 100 sets of data selected arbitrarily are directly transferred to and stored in the memory device 1130 on the reception side, while the remaining 9900 sets of three-dimensional data are transferred after being compressed. Thus, the transfer data amount becomes (800×100+1×9900) KB=about 90 MB, and the data compression ratio as a whole becomes about 1/90.

Further, according to this exemplary embodiment, the three-dimensional base data group used for coupling is not transferred. If transferred, it is transferred separately from the compressed data. Therefore, even if the compressed data containing the coupling coefficient is intercepted during transmission, the original three-dimensional data cannot be restored. As a result, the confidentiality of data communication can be ensured.

While exemplary embodiments of the present invention have been described, the present invention is not limited to these embodiments but may be otherwise variously embodied by adding or modifying. For example, although the description above has been made in terms of three-dimensional data containing shape data and texture data, the present invention is also applicable to compression and restoration of three-dimensional data not containing texture data and consisting of shape data only. Further, the invention may be embodied by combining the embodiments described above. For example, the data compression apparatus may have both the compression determination means 303 and the base data selection means 403, or the data compression apparatus may have both the region dividing means 602 and the base data selection means 403. Further, the functions of the data compression apparatus, data restoration apparatus, compression/restoration system, data transmission apparatus, data reception apparatus, and data transmission system according to the present invention can obviously be realized with hardware, but also can be realized with a computer and a program. The program is provided by being recorded on a computer readable recording medium such as a magnetic disc or semiconductor memory. The program is read by the computer when starting up the computer or the like, and controls operation of the computer to cause the computer to function as the compression device 100, the restoration device 200, the compression device 300, the compression device 400, the restoration device 500, the compression device 600, the compression device 700, the restoration device 800, the compression/restoration apparatus 900, the data transmission apparatus 1000, the data reception apparatus 1100, and the data transmission system in the embodiments described above.

The principle of the present invention resides in realizing a high compression ratio by computing a coupling coefficient between input three-dimensional data and a plurality of three-dimensional base data sets and transmitting/receiving this coupling coefficient. Therefore, when vertexes of the input three-dimensional data to be compared are preliminarily determined, it is even possible to omit the corresponding point determination means and the three-dimensional reference data.

Industrial Applicability

The present invention is applicable to uses in which three-dimensional data is stored with its data amount reduced. In a system for compiling a multiplicity of three-dimensional data sets, in particular, a high compression ratio can be obtained without deteriorating the resolution or accuracy of the data. Further, the present invention is also applicable to reduce the load on a network when three-dimensional data is transferred to another memory device through the network.

The invention claimed is:

1. A data compression apparatus comprising:
corresponding point determination means which receives three-dimensional data and generates three-dimensional data to be synthesized, by making vertexes of the received three-dimensional data correspond to vertexes of three-dimensional reference data serving as a reference, by calculating a minimum one of the vertexes of the received three-dimensional data from those of the three-dimensional reference data; and
coefficient computation means which computes coupling coefficients which are necessary for synthesizing the three-dimensional data to be synthesized, by coupling a three-dimensional base data group which is subjected to point determination processing and which is used for synthesis of three-dimensional data, and outputs the computed coupling coefficients as compressed data of the received three-dimensional data, the corresponding point determination means and the coefficient computation means realized by hardware or a computer with a non-transitory computer readable storage medium storing a program.

2. The data compression apparatus according to claim 1, further comprising compression determination means which restores three-dimensional data from the coupling coefficient computed by the coefficient computation means and the three-dimensional base data group, compares the restored three-dimensional data with the three-dimensional data to be synthesized, and if the restoration accuracy does not satisfy a predetermined accuracy, adds new three-dimensional base data to the three-dimensional base data group used for synthesis of three-dimensional data.

3. The data compression apparatus according to claim 2, wherein:
the compressed data contains, in addition to the coupling coefficient, selection information for identifying the three-dimensional base data that has been used for coupling.

4. The data compression apparatus according to claim 1, comprising base data selection means which selects a plurality of three-dimensional base data sets suitable for synthesis of the three-dimensional data to be synthesized from the three-dimensional base data group used for synthesis of three-dimensional data.

5. The data compression apparatus according to claim 1, comprising region dividing means for dividing the three-dimensional data to be synthesized into a plurality of subregions, and
wherein the coefficient computation means computes, for each subregion, coupling coefficients for coupling the three-dimensional base data group divided into a same subregion to synthesize the three-dimensional data to be synthesized, and outputs the coupling coefficient computed for each subregion as compressed data of the received three-dimensional data.

6. The data compression apparatus according to claim 5 wherein:
if the restoration accuracy as a whole does not satisfy the predetermined accuracy even after the division into subregions, the compression determination means further divides the three-dimensional data to be synthesized into smaller subregions and performs control to find a coupling coefficient for each subregion.

7. The data compression apparatus according to claim 5, wherein: the compressed data contains subregion determination data for identifying the subregions.

8. The data compression apparatus according to claim 1, comprising:
region dividing means for dividing the three-dimensional data to be synthesized into a plurality of subregions; and
compression determination means which restores three-dimensional data from the coupling coefficient computed by the coefficient computation means and the three-dimensional base data group, compares the restored three-dimensional data with the three-dimensional data to be synthesized, divides the three-dimensional data to be synthesized into a plurality of subregions by means of the region dividing means if the restoration accuracy does not satisfy a predetermined accuracy, computes, for each subregion, a coupling coefficient for coupling the three-dimensional base data group divided into a same subregion to synthesize the three-dimensional data to be synthesized by means of coefficient computation means, and outputs the coupling coefficient computed for each subregion as compressed data of the received three-dimensional data.

9. The data compression apparatus according to claim 1, comprising a detachable memory device for storing the compressed data.

10. A data transmission apparatus comprising:
a data compression apparatus according to claim 1;
a memory device for storing three-dimensional reference data and a three-dimensional base data group used by the data compression apparatus; and
data transmission means for transmitting compressed data generated by the data compression apparatus.

11. The data transmission apparatus according to claim 10, wherein the data transfer means transfers three-dimensional base data added to the three-dimensional base data group by the data compression apparatus, to a transmission destination of compressed data.

12. A data compression method performed by a computer system realized by hardware or a computer with a non-transitory computer readable storage medium storing a program, the method comprising:
a step (a) in which corresponding point determination means receives three-dimensional data and generates three-dimensional data to be synthesized, by associating vertexes of the received three-dimensional data with vertexes of three-dimensional reference data serving as a reference, by calculating a minimum one of the vertexes of the received three-dimensional data from those of the three-dimensional reference data; and
a step (b) in which coefficient computation means computes a coupling coefficient which is necessary for synthesizing the three-dimensional data to be synthesized, by coupling a three-dimensional base data group which is used for synthesis of three-dimensional data and which is subjected to point determination processing, and outputs the computed coupling coefficient as compressed data of the received three-dimensional data.

13. The data compression method according to claim 12, comprising a step (c) in which compression determination means restores three-dimensional data from the coupling coefficient computed in the step (b) and the three-dimensional base data group, compares the restored three-dimensional data with the three-dimensional data to be synthesized, and adds new three-dimensional base data to a three-dimensional base data group used for synthesis of three-dimensional data if the restoration accuracy does not satisfy a predetermined accuracy.

14. The data compression method according to claim 13, wherein: the compressed data contains selection information for identifying three-dimensional base data which has been used for synthesis, in addition to the coupling coefficient.

15. The data compression method according to claim 12, comprising a step (d) in which base data selection means selects a plurality of three-dimensional base data sets suitable for synthesis of the three-dimensional data to be synthesized from a three-dimensional base data group used for synthesis of three-dimensional data.

16. The data compression method according to claim 12, wherein: the compressed data is stored in a detachable memory device.

17. A data transmission method wherein:
compressed data generated by the data compression method according to claim 12 is transferred by means of data transfer means.

18. The data transmission method according to claim 17, wherein:
the data transfer means transfers three-dimensional base data added to the three-dimensional base data group in the data compression method, to a transmission destination of compressed data.

19. A data compression method performed by a computer system realized by hardware or a computer with a non-transitory computer readable storage medium storing a program, the method comprising:
a step (a) in which corresponding point determination means receives three-dimensional data, and generates three-dimensional data to be synthesized, by associating vertexes of the received three-dimensional data with vertexes of three-dimensional reference data serving as a reference, by calculating a minimum one of the vertexes of the received three-dimensional data from those of the three-dimensional reference data;
a step (b) in which region dividing means divides the three-dimensional data to be synthesized into a plurality of subregions; and
a step (c) in which coefficient computation means computes, for each subregion, a coupling coefficient for coupling a three-dimensional base data group used for synthesis of three-dimensional data and divided into a same subregion to synthesize the three-dimensional data to be synthesized, and outputs the coupling coefficient computed for each subregion as compressed data of the received three-dimensional data.

20. The data compression method according to claim 19 wherein:
the compressed data contains subregion determination data for identifying the subregions.

21. A data compression method performed by a computer system realized by hardware or a computer with a non-transitory computer readable storage medium storing a program, the method comprising:
a step (a) in which corresponding point determination means receives three-dimensional data and generates three-dimensional data to be synthesized in which vertexes of the received three-dimensional data are associated with vertexes of three-dimensional reference data serving as a reference for determining association relationship between vertexes;
a step (b) in which coefficient computation means computes a coupling coefficient for coupling a three-dimensional base data group used for synthesis of three-dimensional data to synthesize the three-dimensional data to be synthesized, and outputs the computed coupling coefficient as compressed data of the received three-dimensional data; and
a step (c) in which compression determination means restores three-dimensional data from the coupling coefficient computed in the step (b) and the three-dimensional base data group, compares the restored three-dimensional data with the three-dimensional data to be synthesized, and divides the three-dimensional data to be synthesized into a plurality of subregions by means of the region dividing means if the restoration accuracy does not satisfies a predetermined accuracy, computes, for each subregion, a coupling coefficient for coupling a three-dimensional base data group divided into a same subregion to synthesize the three-dimensional data to be synthesized by means of the coefficient computation means, and outputs the coupling coefficient computed for each subregion as compressed data of the received three-dimensional data.

22. The data compression method according to claim 21, wherein: when the restoration accuracy as a whole does not satisfies the predetermined accuracy even after the division into subregions, the three-dimensional data to be synthesized is further divided into smaller subregions and a coupling coefficient is found for each subregion.

23. A non-transitory computer storage medium for storing a data compression program, wherein the data compression program is for operating a computer which has a memory device for storing three-dimensional reference data serving as a reference for determining correspondence relationship between vertexes and a three-dimensional base data group used for synthesis of three-dimensional data, so as to function as:
corresponding point determination means which receives three-dimensional data, and generates three-dimensional data to be synthesized, by making vertexes of the received three-dimensional data correspond to vertexes of the three-dimensional reference data by calculating a minimum one of the vertexes of the received three-dimensional data from those of the three-dimensional reference date: and
coefficient computation means which computes coupling coefficients necessary for synthesizing the three-dimensional data to by synthesized by coupling a three-dimensional base data group used for synthesis of three-dimensional data, and outputs the computed coupling coefficient as compressed data of the received three-dimensional data.

24. The non-transitory computer storage medium for storing a data compression program according to claim 23, the data compression program causing the computer to function further as compression determination means which restores three-dimensional data from the coupling coefficient computed by the coefficient computation means and the three-dimensional base data group, compares the restored three-dimensional data and the three-dimensional data to be synthesized, and adds new three-dimensional base data to a three-dimensional base data group used for synthesis of three-dimensional data if the restoration accuracy does not satisfy a predetermined accuracy.

25. The non-transitory computer storage medium for storing a data compression program according to claim 24, wherein the compressed data contains selection information for identifying three-dimensional base data that has been used for coupling, in addition to the coupling coefficient.

26. The non-transitory computer storage medium for storing a data compression program according to claim 23, the data compression program causing the computer to function further as base data selection means which selects a plurality of three-dimensional base data sets suitable for synthesis of the three-dimensional data to be synthesized, from the three-dimensional base data group used for synthesis of three-dimensional data.

27. The non-transitory computer storage medium for storing a data compression program according to claim 23, the data compression program causing the computer to function further as region dividing means for dividing the three-dimensional data to be synthesized into a plurality of subregions and characterized in that the coefficient computation means computes, for each subregion, a coupling coefficient for coupling a three-dimensional base data group divided into a same subregion for synthesizing the three-dimensional data to be synthesized, and outputs the coupling coefficient computed for each subregion as compressed data of the received three-dimensional data.

28. The non-transitory computer storage medium for storing a data compression program according to claim 27, wherein:
the compressed data contains subregion determination data for identifying the subregions.

29. The non-transitory computer storage medium for storing a data compression program according to claim 23, causing the computer to function further as:
region dividing means which divides the three-dimensional data to be synthesized into a plurality of subregions; and
compression determination means which restores three-dimensional data from the coupling coefficient computed by the coefficient computation means and the three-dimensional base data group, compares the restored three-dimensional data with the three-dimensional data to be synthesized, divides the three-dimensional data to be synthesized into a plurality of subregions by means of the region dividing means if the restoration accuracy does not satisfy a predetermined accuracy, computes a coupling coefficient for each subregion for coupling the three-dimensional base data group divided into a same subregion to synthesize three-dimensional data to be synthesized by means of the coefficient computation means, and outputs the coupling coefficient computed for each subregion as compressed data of the received three-dimensional data.

30. The non-transitory computer storage medium for storing a data compression program according to claim 29, wherein:
when the restoration accuracy as a whole does not satisfy the predetermined accuracy even if the data is compressed after being divided into subregions, the compression determination means further divides the three-dimensional data to be synthesized into smaller subregions, and performs control to find a coupling coefficient for each subregion.

31. The non-transitory computer storage medium for storing a data compression program according to claim 23, wherein:
the compressed data is stored in a detachable memory device.

32. A non-transitory computer storage medium for storing a data transmission program comprising the data compression program according to claim 23 and a program causing a computer to function as data transfer means for transmitting compressed data generated by the data compression program.

33. The non-transitory computer storage medium for storing a data transmission program according to claim 32, wherein:
the data transfer means transfers three-dimensional base data added to the three-dimensional base data group by the data compression program to a transmission destination of compressed data.

* * * * *